(12) United States Patent
Akutsu et al.

(10) Patent No.: US 8,328,672 B2
(45) Date of Patent: Dec. 11, 2012

(54) POWER UNIT

(75) Inventors: Shigemitsu Akutsu, Wako (JP);
Noriyuki Abe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 674 days.

(21) Appl. No.: 12/552,547

(22) Filed: Sep. 2, 2009

(65) Prior Publication Data

US 2010/0056312 A1  Mar. 4, 2010

(30) Foreign Application Priority Data

Sep. 4, 2008 (JP) .................................. 2008-227188

(51) Int. Cl.
*F16H 3/72* (2006.01)
(52) U.S. Cl. .......................................... 475/5; 475/324
(58) Field of Classification Search .............. 475/5, 207, 475/210, 214, 219, 271, 275–291, 324; 180/53.1, 180/53.5, 53.8
See application file for complete search history.

(56) References Cited

U.S. PATENT DOCUMENTS

| | | | | |
|---|---|---|---|---|
| 6,634,986 B2 * | 10/2003 | Kima | | 477/107 |
| 7,479,081 B2 * | 1/2009 | Holmes | | 475/5 |
| 7,500,931 B2 * | 3/2009 | Rosemeier et al. | | 475/5 |
| 7,951,033 B2 * | 5/2011 | Abe | | 475/5 |
| 2007/0149334 A1 * | 6/2007 | Holmes et al. | | 475/5 |
| 2008/0039257 A1 * | 2/2008 | Holmes | | 475/5 |

FOREIGN PATENT DOCUMENTS

| | | |
|---|---|---|
| JP | 08-324262 A | 12/1996 |
| JP | 2003-269212 | 9/2003 |
| JP | 2005-082126 A | 3/2005 |
| JP | 2008-105550 A | 5/2008 |
| JP | 2008-126711 A | 6/2008 |
| JP | 2008-132971 A | 6/2008 |

* cited by examiner

*Primary Examiner* — Justin Holmes
*Assistant Examiner* — Huan Le
(74) *Attorney, Agent, or Firm* — Squire Sanders (US) LLP

(57) ABSTRACT

A power unit includes: a differential gear (21) in which a first rotating element (21*r*) is connected to an output shaft of a prime mover (2), a second rotating element (21*s*) is connected to a body of rotation of a rotary actuator (3), and a third rotating element (21*c*) is connected to a driven unit (4) via a first power transmission path (22); a first power transmission system (34, 36, 37) selectively operable between an operating state for enabling power transmission in the first power transmission path (22) and an operating state for disconnecting the power transmission; a second power transmission path (23) connecting between the output shaft of the prime mover (2) and the driven unit (4); and a second power transmission system (32) selectively operable between an operating state for enabling power transmission in the second power transmission path and an operating state for disconnecting the power transmission, wherein an auxiliary device (5) is connected to one of the second rotating element (21*s*) and the third rotating element (21*c*) of the differential gear (21).

9 Claims, 20 Drawing Sheets

| POST-EV ENGINE START MODE | FIRST CLUTCH | SECOND CLUTCH | THIRD CLUTCH | ONE-WAY CLUTCH | AUXILIARY DEVICE CLUTCH |
|---|---|---|---|---|---|
| | OFF→ON | ON | OFF | OFF | ON |

| ENGINE DRIVE START-UP MODE | |
|---|---|
| FIRST CLUTCH | OFF |
| SECOND CLUTCH | ON |
| THIRD CLUTCH | OFF |
| ONE-WAY CLUTCH | OFF |
| AUXILIARY DEVICE CLUTCH | OFF→ON |

POWER UNIT

BACKGROUND OF THE INVENTION

1. Field of the Invention

The present invention relates to a power unit for driving a driven unit such as wheels of a vehicle.

2. Description of the Related Art

For example, as a vehicle, which runs by transmitting engine power to driving wheels as a driven unit, there has conventionally been known a vehicle which automatically stops engine operation during a stop at an intersection (so-called an idle-stop vehicle) as described in Japanese Patent Application Laid-Open No. 2003-269212 (hereinafter, referred to as Patent Document 1).

On the other hand, a vehicle generally includes various auxiliary devices such as a water pump, an air conditioner compressor, and a power steering pump. In this case, these auxiliary devices are able to be driven by using the engine power during engine operation. During the stop of engine operation, however, the auxiliary devices are not able to be driven by the engine.

Therefore, in the case of the idle stop vehicle as described in Patent Document 1, there is known a vehicle which has an auxiliary device driving motor to drive auxiliary devices by using the motor during the stop of engine operation as described in Patent Document 1.

Incidentally, the technique of driving the auxiliary devices by using the auxiliary device driving motor during an idle stop of the engine as described in Patent Document 1 is also applicable to a hybrid vehicle having an engine and a drive motor as power generation sources for driving the driving wheels of the vehicle.

In cases where the technique described in Patent Document 1 is applied to the hybrid vehicle, however, the auxiliary device driving motor is mounted on the vehicle in addition to the engine and the drive motor. Therefore, the technique has a problem of inhibiting a reduction in weight or downsizing and a decrease in manufacturing cost of the vehicle.

SUMMARY OF THE INVENTION

The present invention has been provided in view of the above problem. Therefore, it is an object of the present invention to provide a power unit, which has a prime mover and a rotary actuator as power generation sources for driving a driven unit such as driving wheels of a vehicle, capable of driving an auxiliary device by using power of one of the prime mover and the rotary actuator without any auxiliary device driving actuator.

In order to achieve the above object, according to the present invention, there is provided a power unit for driving a driven unit and an auxiliary device, comprising: a prime mover having an output shaft for use in outputting power; a rotary actuator having a body of rotation for use in outputting power; a differential gear having a first rotating element, a second rotating element, and a third rotating element capable of transmitting power between each other, wherein the first rotating element is connected to the output shaft of the prime mover, the second rotating element is connected to the body of rotation of the rotary actuator, and the third rotating element is connected to the driven unit via a first power transmission path; a first power transmission system included in the first power transmission path and selectively operable between a first operating state for enabling power transmission in the first power transmission path and a second operating state for disconnecting power transmission in the first power transmission path; a second power transmission path which connects the output shaft of the prime mover and the driven unit bypassing the differential gear and the first power transmission system; and a second power transmission system included in the second power transmission path and selectively operable between a third operating state for enabling power transmission in the second power transmission path and a fourth operating state for disconnecting power transmission in the second power transmission path, wherein the auxiliary device is connected to one of the second rotating element and the third rotating element of the differential gear (First invention).

According to the power unit of the first invention, in the state where the first power transmission system is placed in the second operating state and the second power transmission system is placed in the fourth operating state, the power transmission via the first power transmission path is disconnected between the prime mover or the rotary actuator and the driven unit. Further, the power transmission via the second power transmission path is disconnected between the prime mover and the driven unit. Moreover, the auxiliary device is connected to one of the second rotating element and the third rotating element of the differential gear, namely a rotating element other than the first rotating element to which the output shaft of the prime mover is connected, out of the first to third rotating elements. Therefore, in the state where the first power transmission system is placed in the second operating state and the second power transmission system is placed in the fourth operating state, for example, the auxiliary device is able to be driven by transmitting the power of the rotary actuator to the auxiliary device without driving the driven unit with the operation of the prime mover stopped.

Moreover, in the state where the first power transmission system is placed in the second operating state and the second power transmission system is placed in the fourth operating state, for example, it is possible to perform an idle operation of the prime mover without driving the driven unit. Further, it is also possible to drive the auxiliary device by transmitting the power of the prime mover or the rotary actuator to the auxiliary device while performing the idle operation of the prime mover.

Further, for example, in a state where the first power transmission system is placed in the first operating state and the second power transmission system is placed in the fourth operating state with the prime mover operated, the driven unit is able to be driven by transmitting the power of the prime mover to the driven unit via the differential gear and the first power transmission path by applying the power of the rotary actuator to the second rotating element of the differential gear while applying the power of the prime mover to the first rotating element of the differential gear. In this instance, the auxiliary device is also able to be driven by transmitting the power of the prime mover or the rotary actuator to the auxiliary device. Additionally, in this instance, the adjustment of the rotational speed of the second rotating element using the rotary actuator enables a change in reduction ratio between the first rotating element and the third rotating element of the differential gear and consequently a change in reduction ratio (change gear ratio) between the output shaft of the prime mover and the driven unit.

Still further, for example, in a state where the first power transmission system is placed in the first operating state and the second power transmission system is placed in the third operating state with the prime mover operated, the driven unit is able to be driven by transmitting the power of the prime mover to the driven unit via the second power transmission path. Moreover, in this instance, it is also possible to drive the auxiliary device by transmitting a part of the power of the prime mover to the auxiliary device or to drive the auxiliary device by transmitting the power of the rotary actuator to the auxiliary device. Further, in this instance, it is possible to transmit the power of the prime mover to the driven unit via the second power transmission path and, in parallel with this, to transmit the power of the rotary actuator to the driven unit via the third rotating element of the differential gear and the first power transmission path.

As described above, according to the power unit according to the present invention, the auxiliary device is able to be driven by using the power of one of the prime mover and the rotary actuator without an actuator for the auxiliary device in various states such as a state where the operation of the prime mover and the driving of the driven unit are stopped and a driven state of the driven unit.

In the first invention described above, the differential gear is more specifically a first planetary gear unit having a first sun gear which forms one of the first rotating element and the second rotating element, a first ring gear which forms the other of the first rotating element and the second rotating element, and a first carrier which forms the third rotating element and rotationally supports a planetary gear meshed with the first sun gear and the first ring gear (Second invention).

According to the second invention, for example, in the case where the first power transmission system is placed in the first operating state and the second power transmission system is placed in the fourth operating state with the prime mover operated, it is possible to combine a torque applied from the prime mover to one of the first ring gear and the first sun gear with a torque applied from the rotary actuator to the other as a positive torque in the first carrier and then to transmit the torque from the first carrier to the driven unit. This enables a larger torque to be transmitted to the driven unit.

In the second invention, preferably the auxiliary device is connected to the first carrier which forms the third rotating element (Third invention).

According to the third invention, it is possible to maintain the rotation direction of the first carrier to be one of the forward and reverse rotation directions in various driving states of the driven unit by appropriately setting the reduction ratio of the first power transmission path and the gear ratios of the first ring gear and the first sun gear of the first planetary gear unit. Therefore, in various driving states of the driven unit, it is possible to maintain the direction of the power transmitted from the first carrier to the auxiliary device to be a direction appropriate for driving the auxiliary device. Consequently, it is possible to provide situations enabling the auxiliary device to be driven as many as possible.

Further, in the first to third inventions, preferably the power unit includes a brake mechanism selectively operable between a fifth operating state in which the rotation of the first rotating element of the differential gear is inhibited or braked and a sixth operating state in which the inhibition or braking of the rotation is released (Fourth invention).

According to the fourth invention, for example, in the case where the brake mechanism is placed in the fifth operating state with the operation of the prime mover stopped in a state where the first power transmission system is placed in the first operating state and the second power transmission system is placed in the fourth operating state, sufficient power of the rotary actuator is able to be transmitted to the driven unit via the second rotating element and the third rotating element of the differential gear and the first power transmission path. Therefore, the driven unit is able to be driven only with the power of the rotary actuator. Further, it is possible to drive the auxiliary device by transmitting a part of the power of the rotary actuator also to the auxiliary device.

Moreover, if the prime mover is, for example, a heat engine, the fifth operating state of the brake mechanism is able to prevent the output shaft of the heat engine from rotating in the reverse direction to the rotation direction in the normal operation. Further, for example, if the second power transmission system is placed in the third operating state with the driven unit driven by the power of the rotary actuator as described above in the case where the prime mover is a heat engine, the heat engine is able to be started by transmitting a part of the power of the rotary actuator to the output shaft of the prime mover (heat engine) via the second power transmission path.

Further, in the first to fourth inventions, preferably the power unit includes a forward/reverse rotation switching mechanism selectively operable between a seventh operating state in which the third rotating element of the differential gear transmits power to the driven unit so that the rotation direction of the driven unit which rotates by the power transmitted to the driven unit is one of two, namely forward and reverse rotation directions via the first power transmission path and an eighth rotating state in which the third rotating element of the differential gear transmits power to the driven unit so that the rotation direction of the driven unit is the other of the two rotation directions (Fifth invention).

According to the fifth invention, in the state where the first power transmission system is placed in the first operating state and the second power transmission system is placed in the fourth operating state, even if the rotation direction of the third rotating element of the differential gear is limited to one direction, it is possible to change the direction of the power transmitted from the output shaft of the prime mover to the driven unit via the differential gear and the first power transmission path by switching the operating state of the forward/reverse rotation switching mechanism between the seventh operating state and the eighth operating state. Therefore, the driven unit is able to be driven in either of the forward and reverse rotation directions. Moreover, for example, in the case where the fifth invention is combined with the fourth invention, the third rotating element and the second rotating element of the differential gear are able to be rotated in the same direction even if the driven unit is driven in either of the forward and reverse rotation directions only with the power of the rotary actuator. Therefore, even if the driven unit is driven in either of the forward and reverse rotation directions, the auxiliary device is able to be driven by transmitting a part of the power of the rotary actuator. Moreover, the rotation direction of the third rotating element of the differential gear is able to be limited to one direction, thereby preventing the operation mode of the power unit of the present invention from being complicated.

In the fifth invention, the forward/reverse rotation switching mechanism, for example, includes: a second planetary gear unit, which has a second sun gear, a second ring gear, and a second carrier rotatably supporting a second planetary gear meshed with the second sun gear and the second ring gear, in which one of the second sun gear and the second ring gear is connected to the third rotating element of the differential gear and the other of the second sun gear and the second ring gear is connected to the driven unit; a first locking mechanism selectively operable between a ninth operating state in which the second carrier is non-rotatably locked and a tenth operating state in which the lock is released; and a first clutch mechanism selectively operable between an 11th operating state in which the second carrier is integrally and rotatably connected to one of the second sun gear and the second ring gear and a 12th operating state in which the connection is released; the forward/reverse rotation switching mechanism has a state in which the first locking mechanism and the first clutch mechanism are placed in the tenth operating state and the 11th operating state, respectively, as one of the seventh operating state and the eighth operating state; and the forward/reverse rotation switching mechanism has a state in which the first locking mechanism and the first clutch mechanism are placed in the ninth operating state and the 12th operating state, respectively, as the other of the seventh operating state and the eighth operating state (Sixth invention).

According to the sixth invention, the forward/reverse rotation switching mechanism is configured as described above and therefore the second carrier of the second planetary gear unit is allowed to rotate and is rotatable integrally with the second sun gear and the second ring gear in the state where the first locking mechanism and the first clutch mechanism are placed in the tenth operating state and the 11th operating state, respectively. Therefore, it is possible to perform power transmission between the third rotating element of the differential gear and the driven unit via the first power transmission path. In this instance, if the third rotating element of the differential gear is rotatably driven in one predetermined direction, the second sun gear and the second ring gear rotate in the same direction (hereinafter, the rotation direction is referred to as the first rotation direction in this section).

Further, in the state where the first locking mechanism and the first clutch mechanism are placed in the ninth operating state and the 12th operating state, respectively, the second sun gear and the second ring gear are rotatable in the reverse direction to each other with the second carrier of the second planetary gear unit non-rotatably locked. Therefore, it is possible to perform power transmission between the third rotating element of the differential gear and the driven unit via the first power transmission path. In this case, the rotation direction of one of the second sun gear and the second ring gear in the case where the third rotating element of the differential gear is rotationally driven in the predetermined direction is the same as the first rotation direction, while the rotation direction of the other of the second sun gear and the second ring gear is reverse to the first rotation direction.

Therefore, the state where the first locking mechanism and the first clutch mechanism are placed in the tenth operating state and the 11th operating state, respectively, functions as one of the seventh operating state and the eighth operating state of the forward/reverse rotation switching mechanism. Moreover, the state where the first locking mechanism and the first clutch mechanism are placed in the ninth operating state and the 12th operating state, respectively, functions as the other of the seventh operating state and the eighth operating state.

In the above sixth invention, the combination of the operating states of the first locking mechanism and the first clutch mechanism enables the forward/reverse rotation switching mechanism to have a function of the first power transmission system. Specifically, in the sixth invention, the forward/reverse rotation switching mechanism serves as the first power transmission system: the forward/reverse rotation switching mechanism is able to have a state in which the first locking mechanism and the first clutch mechanism are placed in the tenth operating state and the 11th operating state, respectively, or a state in which the first locking mechanism and the first clutch mechanism are placed in the ninth operating state and the 12th operating state, respectively, as the first operating state; and the forward/reverse rotation switching mechanism is able to have a state in which the first locking mechanism and the first clutch mechanism are placed in the tenth operating state and the 12th operating state, respectively, as the second operating state (Seventh invention).

According to the seventh invention, in the state in which the first locking mechanism and the first clutch mechanism are placed in the tenth operating state and the 11th operating state, respectively, or the state in which the first locking mechanism and the first clutch mechanism are placed in the ninth operating state and the 12th operating state, respectively, it is possible to perform power transmission between the third rotating element of the differential gear and the driven unit via the first power transmission path as described with respect to the sixth invention. Therefore, these states function as the first operating state of the first power transmission system.

Further, in the state in which the first locking mechanism and the first clutch mechanism are placed in the tenth operating state and the 12 operating state, respectively, the second carrier of the second planetary gear unit is freely rotatable (a state in which almost no power acts on the second carrier) and therefore the power transmission between the second sun gear and the second ring gear of the second planetary gear unit is substantially disconnected. Consequently, the power transmission in the first power transmission path is disconnected in the second planetary gear unit. Therefore, this state functions as the second operating state of the first power transmission system.

In this manner, the forward/reverse rotation switching mechanism is provided with the function of the first power transmission system, thereby enabling a reduction in the number of parts of the components of the first power transmission path to simplify the configuration of the first power transmission path.

Further, in the first to seventh inventions, preferably the power unit includes a second locking mechanism selectively operable between a 13th operating state in which the third rotating element of the differential gear is non-rotatably locked and a 14th operating state in which the lock is released (Eighth invention).

According to the eighth invention, for example, in the rotation stopped state of the driven unit, the second locking mechanism placed in the 13th operating state enables power transmission between the prime mover and the rotary actuator via the differential gear. Therefore, for example, if the prime mover is a heat engine, the heat engine is able to be started by transmitting the power of the rotary actuator to the output shaft of the prime mover (heat engine) with the rotation of the driven unit stopped. Moreover, if the rotary actuator is, for example, a motor, the regeneration of the motor is able to be performed by transmitting power from the prime mover to a body of rotation (rotor) with the rotation of the driven unit stopped.

In the sixth or seventh invention including the forward/reverse rotation switching mechanism which has the second planetary gear unit, the first locking mechanism, and the first clutch mechanism, the forward/reverse rotation switching mechanism may be provided with the function of the second locking mechanism in the eighth invention. Specifically, in this case, the forward/reverse rotation switching mechanism has a state in which the first locking mechanism and the first clutch mechanism are placed in the ninth operating state and the 11th operating state, respectively, as the operating state in which the third rotating element of the differential gear is non-rotatably locked (Ninth invention).

According to the ninth invention, in the state in which the first locking mechanism and the first clutch mechanism are placed in the ninth operating state and the 11th operating state, respectively, all of the second sun gear, the second ring gear, and the second carrier of the second planetary gear unit are non-rotatably locked. Therefore, it is also possible to non-rotatably lock the third rotating element of the differential gear connected to the second sun gear or the second ring gear. Moreover, in the case where the first locking mechanism is placed in the tenth operating state or the first clutch mechanism is placed in the 12th operating state, the lock is released. Therefore, the forward/reverse rotation switching mechanism is able to have the function of the second locking mechanism.

The provision of the function of the second locking mechanism to the forward/reverse rotation switching mechanism enables a reduction in the number of parts of the components of the first power transmission path to simplify the configuration of the first power transmission path.

DETAILED DESCRIPTION OF THE PREFERRED EMBODIMENTS

First Embodiment

A first embodiment of the present invention will be described with reference to FIGS. 1 to 11.

First, referring to FIGS. 1 and 2, the configuration of a power unit 1 according to this embodiment will be described.

Figure 1:
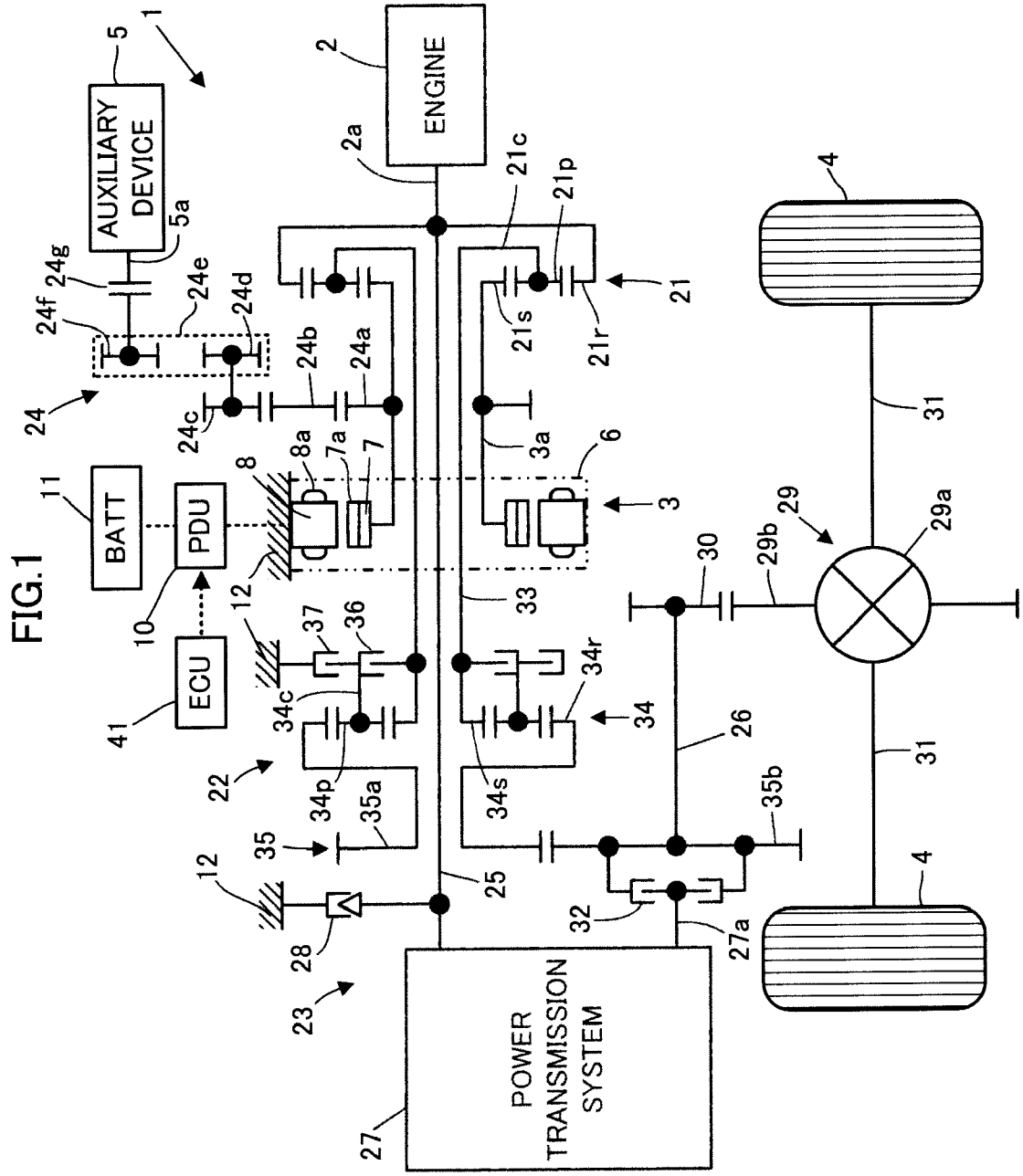
FIG. 1 is a diagram schematically illustrating the general configuration of a vehicle having a power unit 1 according to a first embodiment of the present invention.

Referring to FIG. 1, the power unit 1 according to this embodiment is a power unit mounted on a hybrid vehicle, having an engine 2 and a motor 3 as power generation sources. Further, the power unit 1 is adapted to be capable of driving a pair of driving wheels 4, 4 by transmitting power of the engine 2 or the motor 3 to the driving wheels 4, 4. In addition, the power unit 1 is adapted to be capable of driving an auxiliary device 5 mounted on the vehicle by transmitting the power of the engine 2 or the motor 3 to the auxiliary device 5 as well as the driving wheels 4, 4. The auxiliary device 5 is, for example, an air conditioner compressor, a water pump, an oil pump, or the like.

In this embodiment, the engine 2 and the motor 3 correspond to a prime mover and a rotary actuator in the present invention, respectively. Moreover, the driving wheels 4 correspond to a driven unit in the present invention.

The engine 2 is an internal combustion engine which generates power (torque) by burning fuel such as gasoline, diesel oil, alcohol, or the like, having an output shaft (crank shaft) 2a for outputting the generated power to the outside. Similarly to a normal vehicle engine, the engine 2 adjusts power which the engine 2 outputs via the output shaft 2a by controlling an opening degree of a throttle valve provided in an intake channel which is not shown (controlling an intake air amount of the engine 2).

The motor 3 is a three-phase DC brushless motor in this embodiment, having a rotor (body of rotation) 7 rotatably supported in a housing 6 of the motor 3, a stator 8 fixed to the housing 6 around the rotor 7, and an output shaft 3a for transmitting power (torque) generated in the rotor 7 to the outside. A plurality of permanent magnets 7a are attached to the rotor 7 and three-phase coil (armature winding) 8a is attached to the stator 8. Moreover, the output shaft 3a is coaxially fixed to the rotor 7 so as to rotate integrally with the rotor 7 and is extended to the outside from the inside of the housing 6. The housing 6 (consequently, the stator 8) of the motor 3 is provided in a fixed manner to an immovable part 12 immovable relative to a vehicle body such as an outer case of the power unit 1.

The coil 8a of the motor 3 is electrically connected to a battery (secondary battery) 11 as a DC power supply via a power drive unit 10 (hereinafter, referred to as the PDU 10) which is a drive circuit including an inverter circuit. Moreover, the PDU 10 is electrically connected to an electronic control unit 41 (hereinafter, referred to as the ECU 41) which performs operation control of the power unit 1 including the motor 3. In addition, the ECU 41 controls current flowing into the coil 8a via the PDU 10 to adjust the power (torque) which the motor 3 outputs from the rotor 7 via the output shaft 3a. In this case, by controlling the PDU 10, the motor 3 is capable of performing power running where a power running torque is generated in the rotor 7 by electric energy supplied from the battery 11 and performing regeneration in which electricity is generated by mechanical energy (rotational energy) supplied to the rotor 7 via the output shaft 3a from the outside and a regenerative torque (dynamic braking torque) is generated in the rotor 7 while giving a charge of the power energy to the battery 11.

The ECU 41, which is an electronic circuit unit including a CPU, a RAM, a ROM, an interface circuit, and the like, controls the operation of the power unit 1 by performing control processing specified by a previously implemented program. In this case, the functions implemented by the control processing of the ECU 41 includes a function of controlling the operation of the motor 3 via the PDU 10, a function of controlling the operation of the engine 2 via an engine control actuator such as a throttle valve actuator which is not shown, a function of controlling the operations of first to third clutches 32, 36, and 37 and an auxiliary device clutch 24g described later via an actuator or drive circuit which is not shown, and a function of controlling the gear shifting operations of a CVT 27c (continuously variable transmission) described later via an actuator which is not shown.

The power unit 1 includes, as mechanical elements for driving the driving wheels 4, 4 and the auxiliary device 5 by the engine 2 or the motor 3, a first planetary gear unit 21 which is a differential gear, a first power transmission path 22 and a second power transmission path 23 for use in performing power transmission between the engine 2 or the motor 3 and the driving wheels 4, 4, and an auxiliary device power transmission path 24 for use in performing power transmission between the engine 2 or the motor 3 and the auxiliary device 5.

In this embodiment, the first planetary gear unit 21 is a single-pinion type planetary gear unit and coaxially has a sun gear 21s, a ring gear 21r, and a carrier 21c, which rotatably supports a plurality of planetary gears 21p meshed with the gears 21r and 21s between the sun gear 21s and the ring gear 21r, as three rotating elements. As is generally known, these three rotating elements 21s, 21r, and 21c are able to transmit power between each other and rotate while maintaining the relationship between their respective numbers of rotations (rotational speeds) at a certain collinear relationship.

In this embodiment, the first planetary gear unit 21 is disposed between the engine 2 and the motor 3 so as to be coaxial with the output shaft 2a of the engine 2 and the output shaft 3a of the motor 3. Further, one of the three rotating elements 21s, 21r, and 21c of the first planetary gear unit 21, for example, the ring gear 21r is connected to the output shaft 2a so as to rotate in conjunction with the output shaft 2a of the engine 2. Moreover, another rotating element of the first planetary gear unit 21, for example, the sun gear 21s is connected to the output shaft 3a so as to rotate in conjunction with the output shaft 3a of the motor 3. In this embodiment, the ring gear 21r is connected to the output shaft 2a so as to rotate integrally with the output shaft 2a of the engine 2. Further, the sun gear 21s is connected to the output shaft 3a of the motor 3 so as to rotate integrally with the rotor 7 and the output shaft 3a of the motor 3.

Moreover, the carrier 21c, which is the remaining one of the rotating elements of the first planetary gear unit 21, is connected to the driving wheels 4, 4 via the first power transmission path 22. The details of the first power transmission path 22 will be described later.

Alternatively, the ring gear 21r may be connected to the output shaft 2a of the engine 2 via a reduction gear so that the ring gear 21r and the output shaft 2a rotate in conjunction with each other at rotational speeds different from each other. Similarly, the sun gear 21s may be connected to the output shaft 3a of the motor 3 via a reduction gear so that the sun gear 21s and the output shaft 3a rotate in conjunction with each other at rotational speeds different from each other.

Additionally, in this embodiment, the ring gear 21r, the sun gear 21s, and the carrier 21c of the first planetary gear unit 21 correspond to a first rotating element (a first ring gear), a second rotating element (a first sun gear), and a third rotating element (a first carrier) of a differential gear (a first planetary gear unit) according to the present invention, respectively.

The second power transmission path 23 connects the output shaft 2a of the engine 2 to the driving wheels 4, 4 so that power is able to be transmitted between the output shaft 2a of the engine 2 and the driving wheels 4, 4 bypassing (not via) the first planetary gear unit 21 and a second planetary gear unit 34 of the first power transmission path 22 whose details will be described later. The second power transmission path 23 includes a first rotating shaft 25 provided so as to rotate in conjunction with the output shaft 2a of the engine 2, a second rotating shaft 26 provided so as to rotate in conjunction with the driving wheels 4, 4, and a power transmission system 27 which transmits power between the first rotating shaft 25 and the second rotating shaft 26.

The first rotating shaft 25 is coaxially connected to the output shaft 2a so as to rotate integrally with the output shaft 2a of the engine 2. In this case, the first rotating shaft 25 extends passing through a hollow portion formed in the shaft portion of the sun gear 21s of the first planetary gear unit 21 and the shaft portion of the rotor 7 and the output shaft 3a of the motor 3 and is provided rotatably relative to the sun gear 21s, the rotor 7, and the output shaft 3a.

In this embodiment, the first rotating shaft 25 is connected to the immovable part 12 via a one-way clutch 28. When the first rotating shaft 25 is going to rotate in the same rotation direction (hereinafter, referred to as the forward rotation direction) as the rotation direction of the output shaft 2a during operation of the engine 2, the one-way clutch 28 is automatically brought into the operating state for allowing the first rotating shaft 25 to rotate in the forward rotation direction by releasing the first rotating shaft 25 from the immovable part 12. Further, when the first rotating shaft 25 is going to rotate in the reverse direction (hereinafter, referred to as the reverse rotation direction) to the forward rotation direction, the one-way clutch 28 is automatically brought into the operating state for inhibiting the first rotating shaft 25 to rotate in the reverse direction by binding (latching) the first rotating shaft 25 to the immovable part 12.

In this embodiment, the first rotating shaft 25 is provided integrally with the ring gear 21r of the first planetary gear unit 21 and the output shaft 2a of the engine 2 and therefore, if the one-way clutch 28 is brought into the operating state for inhibiting the rotation of the first rotating shaft 25, the ring gear 21r of the first planetary gear unit 21 is also inhibited to rotate. If the one-way clutch 28 is brought into the operating state for allowing the rotation of the first rotating shaft 25, the rotation of the ring gear 21r of the first planetary gear unit 21 is released from the inhibition. Therefore, in this embodiment, the one-way clutch 28 corresponds to a brake mechanism in the present invention. In this case, the operating state of the one-way clutch 28 for inhibiting the rotation of the first rotating shaft 25 corresponds to a fifth operating state in the present invention, and the operating state of the one-way clutch 28 for allowing the rotation of the first rotating shaft 25 corresponds to a sixth operating state in the present invention.

The second rotating shaft 26 is disposed in parallel with the first rotating shaft 25 and is connected to the driving wheels 4, 4 via a differential gear unit 29 between the driving wheels 4, 4. More specifically, the differential gear unit 29 includes a gear case 29a containing a side gear, which is not shown, connected to the driving wheels 4, 4 respectively via axles 31, 31 and a gear 29b fixed to the outer periphery of the gear case 29a. In addition, the gear 29b of the differential gear unit 29 is meshed with a gear 30 fixed to one end of the second rotating shaft 26. Thereby, the second rotating shaft 26 is connected to the driving wheels 4, 4 via the differential gear unit 29 so as to rotate in conjunction with the driving wheels 4, 4.

The power transmission system 27 has a third rotating shaft 27a coaxially connected to the second rotating shaft 26 via a first clutch 32 and connects the third rotating shaft 27a to the first rotating shaft 25 so that the third rotating shaft 27a and the first rotating shaft 25 rotate in conjunction with each other. FIG. 2 shows the configuration of the power transmission system 27.

Figure 2:
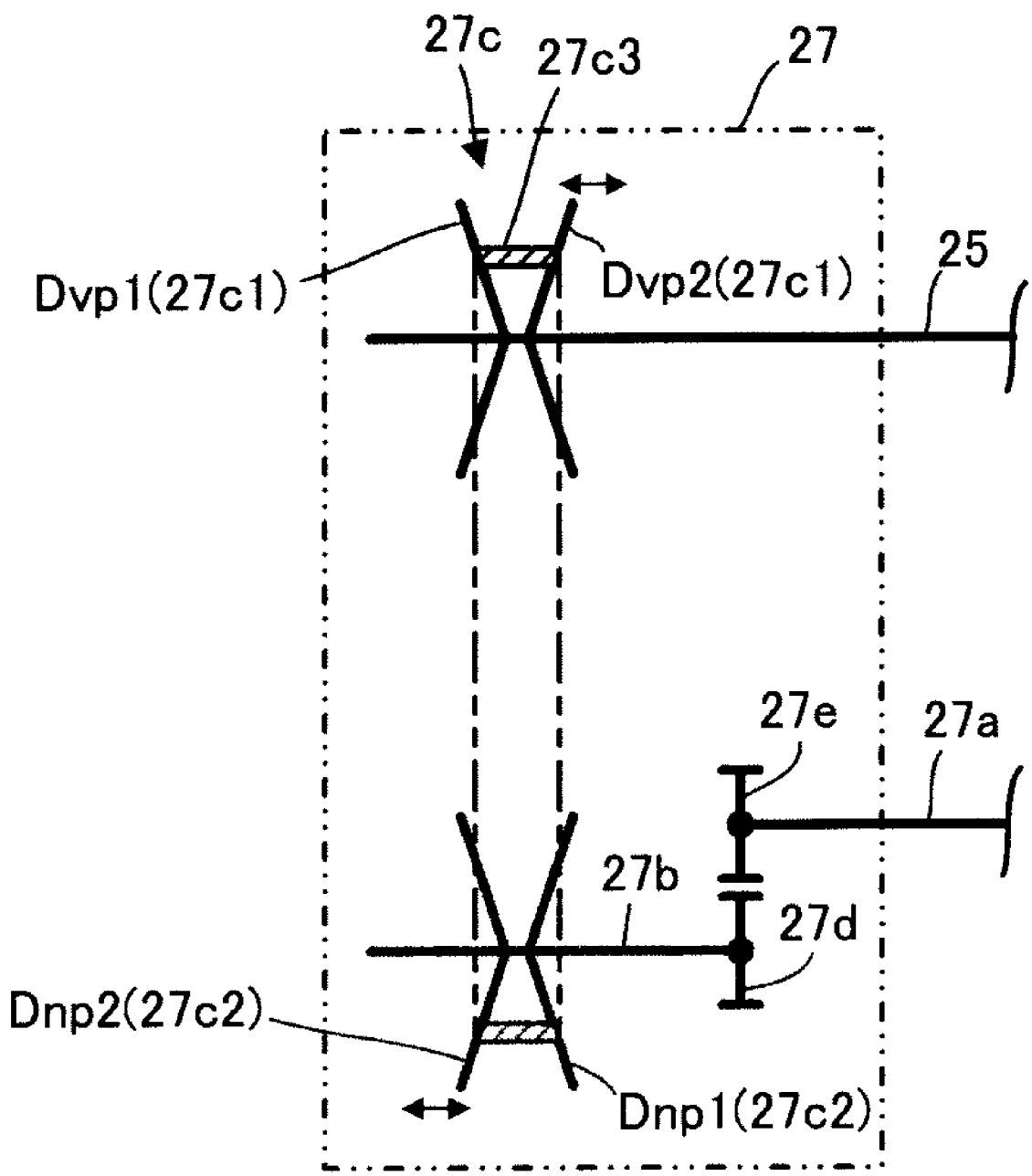
FIG. 2 is a diagram schematically illustrating the configuration of a power transmission system 27 included in the power unit 1 according to the first embodiment.

As shown in FIG. 2, in this embodiment, the power transmission system 27 includes a rotatable driven shaft 27b disposed in parallel with the first rotating shaft 25, a CVT (continuously variable transmission) 27c as a change gear connecting the driven shaft 27b to the first rotating shaft 25, and a pair of gears 27d and 27e meshed with each other and respectively fixed to the driven shaft 27b and the third rotating shaft 27a.

The CVT 27c has a well-known structure and includes a drive pulley 27c1 attached to the first rotating shaft 25 so as to rotate integrally with the first rotating shaft 25, a driven pulley 27c2 attached to the driven shaft 27b so as to rotate integrally with the driven shaft 27b, and an endless belt 27c3 wound around the drive pulley 27c1 and the driven pulley 27c2. The drive pulley 27c1 is formed of a drive-side fixed pulley half body Dvp1 fixed to the first rotating shaft 25 and a drive-side movable pulley half body Dvp2 supported by the first rotating shaft 25 so as to slide in the central axis direction of the first rotating shaft 25 by means of an actuator which is not shown. Similarly, the driven pulley 27c2 is formed of a driven-side fixed pulley half body Dnp1 fixed to the driven shaft 27b and a driven-side movable pulley half body Dnp2 supported by the driven shaft 27b so as to slide in the central axis direction of the driven shaft 27b by means of an actuator which is not shown. Further, the movements of the drive-side movable pulley half body Dvp2 and the driven-side movable pulley half body Dnp2 in the central axis direction by the actuators, which are not shown, continuously vary the effective diameter of the endless belt 27c3 in each of the drive pulley 27c1 and the driven pulley 27c2. This makes a reduction ratio between the drive pulley 27c1 and the driven pulley 27c2 continuously (steplessly) variable. It is then possible to continuously vary the reduction ratio (change gear ratio) between the first rotating shaft 25 and the third rotating shaft 27a.

The power transmission system 27 according to this embodiment is configured as described above and therefore performs power transmission between the first rotating shaft 25 and the third rotating shaft 27a so that the first rotating shaft 25 rotates in the reverse direction to the rotation direction of the third rotating shaft 27a.

Returning to the description of FIG. 1, the first clutch 32 is a clutch mechanism which operates to connect or disconnect between the second rotating shaft 26 and the third rotating shaft 27a (a clutch mechanism selectively operable between the connected state and the disconnected state) under the control of the ECU 41. In this case, if the first clutch 32 is placed in the connected state, the second rotating shaft 26 is connected to the third rotating shaft 27a via the first clutch 32 so as to rotate integrally with each other. In this state, power transmission is enabled between the second rotating shaft 26 and the third rotating shaft 27a. If the first clutch 32 is placed in the disconnected state, the connection between the second rotating shaft 26 and the third rotating shaft 27a via the first clutch 32 is released. In this state, the power transmission between the second rotating shaft 26 and the third rotating shaft 27a is disconnected.

The second power transmission path 23 configured as described above connects the output shaft 2a of the engine 2 to the driving wheels 4, 4 via the first rotating shaft 25, the power transmission system 27 (including the third rotating shaft 27a), the first clutch 32, the second rotating shaft 26, the gear 30, the differential gear unit 29 (including the gear 29b), and the axles 31, 31. In the second power transmission path 23, the first clutch 32 placed in the connected state enables power transmission between the output shaft 2a of the engine 2 and the driving wheels 4, 4 (power transmission bypassing the first planetary gear unit 21 and the second planetary gear unit 34 described later), by which the output shaft 2a of the engine 2 is connected to the driving wheels 4, 4 so as to rotate in conjunction with each other. In the connected state of the first clutch 32, the rotation direction of the driving wheels 4, 4 during forward rotation of the output shaft 2a of the engine 2 is the same as the advance direction of the vehicle.

If the first clutch 32 is placed in the disconnected state, the power transmission between the output shaft 2a of the engine 2 and the driving wheels 4, 4 through the second power transmission path 23 is disconnected at the first clutch 32.

Additionally, the first clutch 32 provided in the second power transmission path 23 corresponds to a second power transmission system in the present invention. In this case, the connected state of the first clutch 32 corresponds to a third operating state in the present invention and the disconnected state of the first clutch 32 corresponds to a fourth operating state in the present invention.

The first power transmission path 22 connects the carrier 21c, as the remaining one rotating element (the third rotating element) other than the two rotating elements (the ring gear 21r and the sun gear 21s) respectively connected to the output shaft 2a of the engine 2 and the output shaft 3a of the motor 3 among three rotating elements 21s, 21r, and 21c of the first planetary gear unit 21, to the driving wheels 4, 4 so as to enable power transmission between the carrier 21c and the driving wheels 4, 4. In other words, the first power transmission path 22 connects the carrier 21c of the first planetary gear unit 21 to the driving wheels 4, 4 so as to enable power to be transmitted between the engine 2 or the motor 3 and the driving wheels 4, 4 via the first planetary gear unit 21. In this condition, in this embodiment, the first power transmission path 22 has a portion on the driving wheels 4, 4 side from the first clutch 32 in the second power transmission path 23, that is, a portion formed of the second rotating shaft 26, the gear 30, the differential gear unit 29, and the axles 31, 31 as a power transmission path shared with the second power transmission path 23 (hereinafter, in some cases, referred to as the shared power transmission path). A portion other than the shared power transmission path in the first power transmission path 22 is a power transmission path different from the second power transmission path 23.

The portion other than the shared power transmission path in the first power transmission path 22 includes a fourth rotating shaft 33 provided so as to be rotatable in conjunction with the carrier 21c of the first planetary gear unit 21, a second planetary gear unit 34 with one rotating element connected to the fourth rotating shaft 33, and a power transmission system 35 connecting another rotating element of the second planetary gear unit 34 to the second rotating shaft 26.

The fourth rotating shaft 33, which is a cylindrical rotating shaft, is externally inserted into the first rotating shaft 25 coaxially and is provided rotatably relative to the first rotating shaft 25. Further, the fourth rotating shaft 33 extends passing through a hollow portion formed in the shaft portion of the sun gear 21s of the first planetary gear unit 21 and the shaft portion of the rotor 7 and the output shaft 3a of the motor 3 and is provided rotatably relative to the sun gear 21s, the rotor 7, and the output shaft 3a. Further, the carrier 21c of the first planetary gear unit 21 is fixed to one end of the fourth rotating shaft 33 on the first planetary gear unit 21 side. Thereby, the fourth rotating shaft 33 is connected to the carrier 21c so as to rotate integrally with the carrier 21c of the first planetary gear unit 21.

The second planetary gear unit 34 is a single-pinion type planetary gear unit similar to the first planetary gear unit 21 and is coaxially provided with a sun gear 34s, a ring gear 34r, and a carrier 34c, which rotatably supports a plurality of planetary gears 34p meshed with the gears 34s and 34r between the sun gear 34s and the ring gear 34r, as three rotating elements. These three rotating elements 34s, 34r, and 34c are able to transmit power between each other and rotate while maintaining the relationship between their respective numbers of rotations (rotational speeds) at a certain collinear relationship in the same manner as the first planetary gear unit 21.

The second planetary gear unit 34 is disposed coaxially with the fourth rotating shaft 33 on the opposite side to the first planetary gear unit 21 of both sides in the central axis direction of the motor 3 (between the motor 3 and the power transmission system 27). Then, one of the sun gear 34s and the ring gear 34r of the second planetary gear unit 34, for example, the sun gear 34s is fixed to the other end (the end on the opposite side to the first planetary gear unit 21) of the fourth rotating shaft 33. Thereby, the sun gear 34s of the second planetary gear unit 34 is connected to the carrier 21c of the first planetary gear unit 21 via the fourth rotating shaft 33 so as to rotate integrally with the carrier 21c of the first planetary gear unit 21.

Alternatively, the carrier 21c of the first planetary gear unit 21 may be connected to the sun gear 34s of the second planetary gear unit 34 via a reduction gear so that the carrier 21c and the sun gear 34s rotate in conjunction with each other at rotational speeds different from each other.

Moreover, the carrier 34c of the second planetary gear unit 34 is connected to one of the sun gear 34s and the ring gear 34r, for example, the sun gear 34s via a second clutch 36 and is connected to the immovable part 12 via a third clutch 37.

The second clutch 36 is a clutch mechanism which operates to connect or disconnect between the carrier 34c and the sun gear 34s (a clutch mechanism selectively operable between the connected state and the disconnected state) under the control of the ECU 41. In this case, if the second clutch 36 is placed in the connected state, the carrier 34c is connected to the sun gear 34s via the second clutch 36 so as to rotate integrally with each other (at the same rotational speed). If the second clutch 36 is placed in the disconnected state, the connection between the carrier 34c and the sun gear 34s is released. In this state, the carrier 34c and the sun gear 34s are able to rotate at rotational speeds different from each other.

Moreover, the third clutch 37 is a clutch mechanism which operates to connect or disconnect between the carrier 34c and the immovable part 12 (a clutch mechanism selectively operable between the connected state and the disconnected state) under the control of the ECU 41. In this case, if the third clutch 37 is placed in the connected state, the carrier 34c is bound to the immovable part 12 via the third clutch 37 and locked non-rotatably. If the third clutch 37 is placed in the disconnected state, the carrier 34c is released from the immovable part 12 so as to be rotatable. Therefore, the third clutch 37 functions as a locking mechanism which locks the carrier 34c non-rotatably in the connected state.

In this embodiment, the operation mode of the second planetary gear unit 34 is defined according to the combination of the operating states of the second clutch 36 and the third clutch 37.

Specifically, if the second clutch 36 is placed in the connected state and the third clutch 37 is placed in the disconnected state, three rotating elements 34s, 34r, and 34c of the second planetary gear unit 34 are rotatable integrally with each other (at the same rotational speed). Hereinafter, this operation mode of the second planetary gear unit 34 will be referred to as the integral rotation mode.

Further, if the second clutch 36 is placed in the disconnected state and the third clutch 37 is placed in the connected state, the carrier 34c is non-rotatable and the sun gear 34s and the ring gear 34r are rotatable in conjunction with each other and in the reverse direction to each other. Hereinafter, the operation mode of the second planetary gear unit 34 is referred to as the reverse rotation mode.

Still further, if both of the second clutch 36 and the third clutch 37 are placed in the disconnected state, the carrier 34c is put in an unloaded state in which the carrier 34c is freely rotatable (a state in which torque applicable to the carrier 34c is maintained at "0" or almost "0") and therefore the power transmission by the second planetary gear unit 34 is substantially disconnected. Hereinafter, this operation mode of the second planetary gear unit 34 is referred to as the power transmission disabled mode.

Moreover, if both of the second clutch 36 and the third clutch 37 are placed in the connected state, all of the three rotating elements 34s, 34r, and 34c of the second planetary gear unit 34 are non-rotatable (rotation stopped state). Hereinafter, this operation mode of the second planetary gear unit 34 is referred to as the non-rotatable mode.

The power transmission system 35 connects the ring gear 34r of the second planetary gear unit 34 and the second rotating shaft 26 so as to rotate in conjunction with each other. In this embodiment, the power transmission system 35 has a certain reduction ratio and is formed of a pair of gears 35a and 35b meshed with each other. In this case, the gear 35a is externally inserted into the first rotating shaft 25 coaxially so as to be rotatable relative to the first rotating shaft 25 and is connected to the ring gear 34r so as to be rotatable integrally with the ring gear 34r of the second planetary gear unit 34. Moreover, the gear 35b is coaxially fixed to the second rotating shaft 26 so as to rotate integrally with the second rotating shaft 26.

The first power transmission path 22 configured as described above connects the carrier 21c of the first planetary gear unit 21 to the driving wheels 4, 4 via the fourth rotating shaft 33, the second planetary gear unit 34, the power transmission system 35, and the shared power transmission path.

In the first power transmission path 22, if the second clutch 36 is placed in the connected state and the third clutch 37 is placed in the disconnected state (if the operation mode of the second planetary gear unit 34 is set to the integral rotation mode) or if the second clutch 36 is placed in the disconnected state and the third clutch 37 is placed in the connected state (if the operation mode of the second planetary gear unit 34 is set to the reverse rotation mode), the carrier 21c of the first planetary gear unit 21 and the driving wheels 4, 4 are connected so as to rotate in conjunction with each other. In these states, power transmission is permitted between the carrier 21c and the driving wheels 4, 4. Consequently, it is possible to transmit power between the output shaft 2a of the engine 2 and the driving wheels 4, 4 via the first planetary gear unit 21 and the second power transmission path 23. Alternatively, it is possible to transmit power between the output shaft 3a of the motor 3 and the driving wheels 4, 4 via the first planetary gear unit 21 and the second power transmission path 23.

If the operation mode of the second planetary gear unit 34 is the integral rotation mode, all of the rotation directions of the three rotating elements 34s, 34r, and 34c of the second planetary gear unit 34 are always the same as the rotation direction of the carrier 21c of the first planetary gear unit 21. Therefore, in this case, if the carrier 21c of the first planetary gear unit 21 is rotationally driven in the forward rotation direction (in the same direction as the rotation direction of the output shaft 2a during operation of the engine 2), power is transmitted from the carrier 21c to the driving wheels 4, 4 via the first power transmission path 22 so that the rotation direction of the driving wheels 4, 4 matches the rotation direction in which the vehicle is advanced out of the two rotation directions (forward and backward rotation directions): the rotation direction in which the vehicle is advanced and the rotation direction in which the vehicle is reversed.

On the other hand, if the operation mode of the second planetary gear unit 34 is the reverse rotation mode, the rotation direction of the sun gear 34s of the second planetary gear unit 34 (=the rotation direction of the carrier 21c of the first planetary gear unit 21) is always reverse to the rotation direction of the ring gear 34r. Therefore, if the carrier 21c of the first planetary gear unit 21 is rotationally driven in the forward rotation direction in the reverse rotation mode, power is transmitted from the carrier 21c to the driving wheels 4, 4 via the first power transmission path 22 so that the rotation direction of the driving wheels 4, 4 is the rotation direction in which the vehicle is reversed.

Therefore, in either of the cases where the operation mode of the second planetary gear unit 34 is the integral rotation mode and where the operation mode is the reverse rotation mode, the rotation direction of the carrier 21c on vehicle driving is always the forward rotation direction. Further, in this embodiment, the second planetary gear unit 34 provided in the second power transmission path 23 has a function as a power transmission element for advancing the vehicle by the setting of the operation mode of the second planetary gear unit 34 to the integral rotation mode. Moreover, the second planetary gear unit 34 has a function as a power transmission element for reversing the vehicle by the setting of the operation mode of the second planetary gear unit 34 to the reverse rotation mode.

If both of the second clutch 36 and the third clutch 37 are placed in the disconnected state (if the operation mode of the second planetary gear unit 34 is set to the power transmission disabled mode), the power transmission via the second planetary gear unit 34 is substantially disabled. Therefore, the power transmission between the carrier 21c of the first planetary gear unit 21 and the driving wheels 4, 4 in the second power transmission path 23 is disconnected at the second planetary gear unit 34.

Further, if both of the second clutch 36 and the third clutch 37 are placed in the connected state (if the operation mode of the second planetary gear unit 34 is set to the non-rotatable mode), all of the three rotating elements 34s, 34r, and 34c of the second planetary gear unit 34 are constantly non-rotatable. On this account, the carrier 21c of the first planetary gear unit 21, the fourth rotating shaft 33, the second rotating shaft 26, and the driving wheels 4, 4 are constantly non-rotatable (maintained in the rotation stopped state). Therefore, the setting of the operation mode of the second planetary gear unit 34 to the non-rotatable mode is enabled only in the vehicle stop state.

Additionally, in this embodiment, the combination of the second planetary gear unit 34, the second clutch 36, and the third clutch 37 embodies a forward/reverse rotation switching mechanism in the present invention. In this instance, the second clutch 36 corresponds to a first clutch mechanism in the present invention and the third clutch 37 corresponds to a first locking mechanism in the present invention. Further, the connected state and the disconnected state of the second clutch 36 correspond to a 11th operating state and a 12th operating state of the first clutch mechanism in the present invention, respectively. The connected state and the disconnected state of the third clutch 37 correspond to a ninth operating state and a tenth operating state of the first locking mechanism in the present invention, respectively. Still further, one of the operating states of the second planetary gear unit 34 in the case where the second clutch 36 and the third clutch 37 are placed in the connected state and the disconnected state, respectively (the operating state in the integral rotation mode) and the operating state of the second planetary gear unit 34 in the case where the second clutch 36 and the third clutch 37 are placed in the disconnected state and the connected state, respectively (the operating state in the reverse rotation mode) corresponds to a seventh operating state of a forward/reverse rotation switching mechanism in the present invention and the other corresponds to an eighth operating state of the forward/reverse rotation switching mechanism in the present invention.

Further, in the forward/reverse rotation switching mechanism (the combination of the second planetary gear unit 34, the second clutch 36, and the third clutch 37) in this embodiment, the power transmission via the second power transmission path 23 is disconnected by setting the operation mode of the second planetary gear unit 34 to the power transmission disabled mode as described above. On this account, the forward/reverse rotation switching mechanism in this embodiment serves as a first power transmission system in the present invention. In this case, the operating state of the second planetary gear unit 34 in the case where the second clutch 36 and the third clutch 37 are placed in the connected state and the disconnected state, respectively, (the operating state in the integral rotation mode) or the operating state of the second planetary gear unit 34 in the case where the second clutch 36 and the third clutch 37 are placed in the disconnected state and the connected state, respectively, (the operating state in the reverse rotation mode) corresponds to a first operating state of the first power transmission system in the present invention. Moreover, the operating state of the second planetary gear unit 34 in the case where both of the second clutch 36 and the third clutch 37 are placed in the disconnected state (the operating state in the power transmission disabled mode) corresponds to a second operating state of the first power transmission system in the present invention.

Further, in the forward/reverse rotation switching mechanism in this embodiment, the carrier 21c of the first planetary gear unit 21 corresponding to the third rotating element of the differential gear in the present invention is locked non-rotatably by setting the operation mode of the second planetary gear unit 34 to the non-rotatable mode as described above. On this account, the forward/reverse rotation switching mechanism in this embodiment serves as a second locking mechanism in the present invention. In this case, the operating state of the second planetary gear unit 34 in the case where both of the second clutch 36 and the third clutch 37 are placed in the connected state (the operating state in the non-rotatable mode) corresponds to a 13th operating state of the second locking mechanism in the present invention. Further, the operating state of the second planetary gear unit 34 in the case where one or both of the second clutch 36 and the third clutch 37 are placed in the disconnected state (the operating state in the integral rotation mode, the reverse rotation mode, or the power transmission disabled mode) corresponds to a 14th operating state of the second locking mechanism in the present invention.

In this embodiment, the auxiliary device power transmission path 24 is a power transmission path for connecting one rotating element other than the rotating element (ring gear 21r) connected to the output shaft 2a of the engine 2 out of the three rotating elements 21s, 21r, and 21c of the first planetary gear unit 21, for example, the sun gear 21s to the auxiliary device 5 so as to enable power transmission between the rotating element and the auxiliary device 5. In this embodiment, the auxiliary device power transmission path 24 includes a first gear 24a coaxially fixed to the output shaft 3a of the motor 3 between the motor 3 and the first planetary gear unit 21, an idle gear 24b meshed with the first gear 24a, a second gear 24c meshed with the idle gear 24b, a third gear 24d coaxially connected to the second gear 24c and provided rotatably and integrally with the second gear 24c, and a fourth gear 27f connected to the third gear 24d via a belt 24e so as to rotate in conjunction with the third gear 24d. Then, the fourth gear 24f is coaxially connected to an input shaft 5a of the auxiliary device 5 via an auxiliary device clutch 24g.

The auxiliary device clutch 24g operates to connect or disconnect between the fourth gear 24f and the input shaft 5a of the auxiliary device 5 under the control of the ECU 41. In this case, the auxiliary device clutch 24g placed in the connected state connects the fourth gear 24f to the input shaft 5a of the auxiliary device 5 via the auxiliary device clutch 24g so that the fourth gear 24f and the input shaft 5a rotate integrally with each other. Further, the auxiliary device clutch 24g placed in the disconnected state releases the connection between the fourth gear 24f and the input shaft 5a of the auxiliary device 5 via the auxiliary device clutch 24g. In this state, the power transmission between the fourth gear 24f and the input shaft 5a of the auxiliary device 5 is disconnected.

The auxiliary device power transmission path 24 configured as described above connects the sun gear 21s of the first planetary gear unit 21 to the auxiliary device 5 via the output shaft 3a of the motor 3, the first gear 24a, the idle gear 24b, the second gear 24c, the third gear 24d, the belt 24e, the fourth gear 24f, and the auxiliary device clutch 24g. In this auxiliary device power transmission path 24, the auxiliary device clutch 24g placed in the connected state enables the power transmission between the sun gear 21s of the first planetary gear unit 21 and the input shaft 5a of the auxiliary device 5 and thereby rotates the sun gear 21s and the input shaft 5a in conjunction with each other. Consequently, power is enabled to be transmitted between the rotor 7 of the motor 3 and the auxiliary device 5 via the auxiliary device power transmission path 24. Alternatively, power is enabled to be transmitted between the output shaft 2a of the engine 2 and the auxiliary device 5 via the first planetary gear unit 21 and the auxiliary device power transmission path 24.

Moreover, the auxiliary device clutch 24g placed in the disconnected state disconnects the power transmission between the sun gear 21s of the first planetary gear unit 21 and the auxiliary device 5 via the auxiliary device power transmission path 24 and consequently the power transmission between the engine 2 or the motor 3 and the auxiliary device 5 at the auxiliary device clutch 24g.

The following describes the operation of the power unit 1 according to this embodiment. The operation mode of the power unit 1 according to this embodiment has various operation modes. FIGS. 3 to 11 visually illustrate the operating states of the power unit 1 in the various operation modes. FIGS. 3 to 11 show the operating states of the first clutch 32, the second clutch 36, the third clutch 37, and the auxiliary device clutch 24g as follows: the clutches 32, 36, 37, and 24g are indicated by solid areas in the case where the operating states are the connected states (hereinafter, referred to as the ON states) and indicated by outlines in the case where the operating states are the disconnected states (hereinafter, referred to as the OFF states) in this embodiment. Moreover, regarding the operating state of the one-way clutch 28, the one-way clutch 28 is indicated by a solid area in the case where the operating state is the state for inhibiting the first rotating shaft 25 to rotate (hereinafter, referred to as the ON state) and indicated by an outline in the case where the operating state is the state for allowing the first rotating shaft 25 to rotate (hereinafter, referred to as the OFF state). Further, in the various operation modes, the components of the power unit 1 rotating in conjunction with each other are indicated by thick lines.

[Stop-Period Idle Stop Mode]

Figure 3:
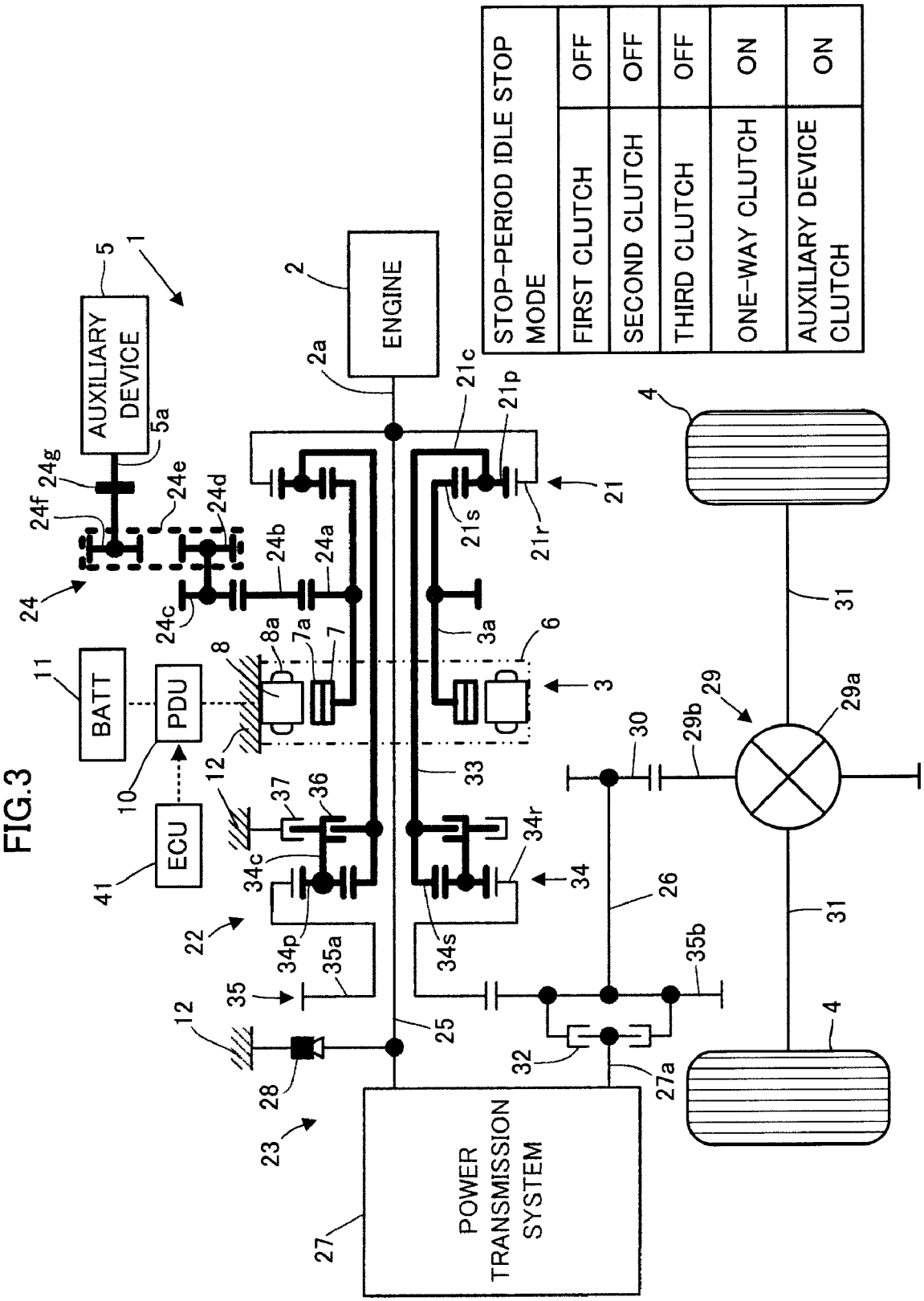
FIG. 3 is a diagram visually illustrating an operating state in a stop-period idle stop mode of the power unit 1 according to the first embodiment.

FIG. 3 shows the operating state of the power unit 1 in a stop-period idle stop mode. The stop-period idle stop mode is the operation mode in which the operation of the engine 2 is stopped in the vehicle stop state, in other words, the operation mode in which a so-called idle stop of the engine 2 is performed.

In the stop-period idle stop mode, as shown, the ECU 41 places all of the first to third clutches 32, 36, and 37 in the OFF state. Therefore, in the stop-period idle stop mode, the power transmission between the output shaft 2a of the engine 2 and the driving wheels 4, 4 via the second power transmission path 23 is disconnected. Moreover, the operation mode of the second planetary gear unit 34 is set to the power transmission disabled mode. This causes the disconnection of the power transmission between the carrier 21c of the first planetary gear unit 21 and the driving wheels 4, 4 via the first power transmission path 22.

In the stop-period idle stop mode, the auxiliary device 5 is driven by the power of the motor 3 as described below, with the operation of the engine 2 stopped in the state where the first to third clutches 32, 36, and 37 are placed in the OFF state as described above. Specifically, the ECU 41 places the auxiliary device clutch 24g in the ON state. Further, the ECU 41 controls the PDU 10 to cause the motor 3 to perform power running where the rotor 7 of the motor 3 rotates in the forward rotation direction. In this operation, the power (power running torque) generated by the motor 3 is transmitted from the rotor 7 and the output shaft 3a to the input shaft 5a of the auxiliary device 5 via the auxiliary device power transmission path 24. Thereby, the auxiliary device 5 is driven by the power of the motor 3.

Moreover, in this case, the sun gear 21s of the first planetary gear unit 21 is rotationally driven in the forward rotation direction integrally with the rotor 7 and the output shaft 3a of the motor 3. Along with this, the ring gear 21r of the first planetary gear unit 21 attempts to rotate in the reverse rotation direction integrally with the output shaft 2a of the engine 2 and the first rotating shaft 25. The one-way clutch 28, however, inhibits the rotation in the reverse rotation direction. In other words, the one-way clutch 28 is brought into the ON state as shown. Thereby, the output shaft 2a of the engine 2 is inhibited from rotating in the reverse rotation direction together with the ring gear 21r of the first planetary gear unit 21 and the first rotating shaft 25 and is maintained in the rotation stopped state.

Therefore, it is possible to drive the auxiliary device 5 by the power of the motor 3 without trouble with the operation of the engine 2 stopped.

During driving of the auxiliary device 5 in the stop-period idle stop mode, the carrier 21c of the first planetary gear unit 21, the fourth rotating shaft 33, and the sun gear 34s and the carrier 34c of the second planetary gear unit 34 idle-rotate in conjunction with the rotor 7 of the motor 3.

[EV Start-Up and Running Mode]

Figure 4:
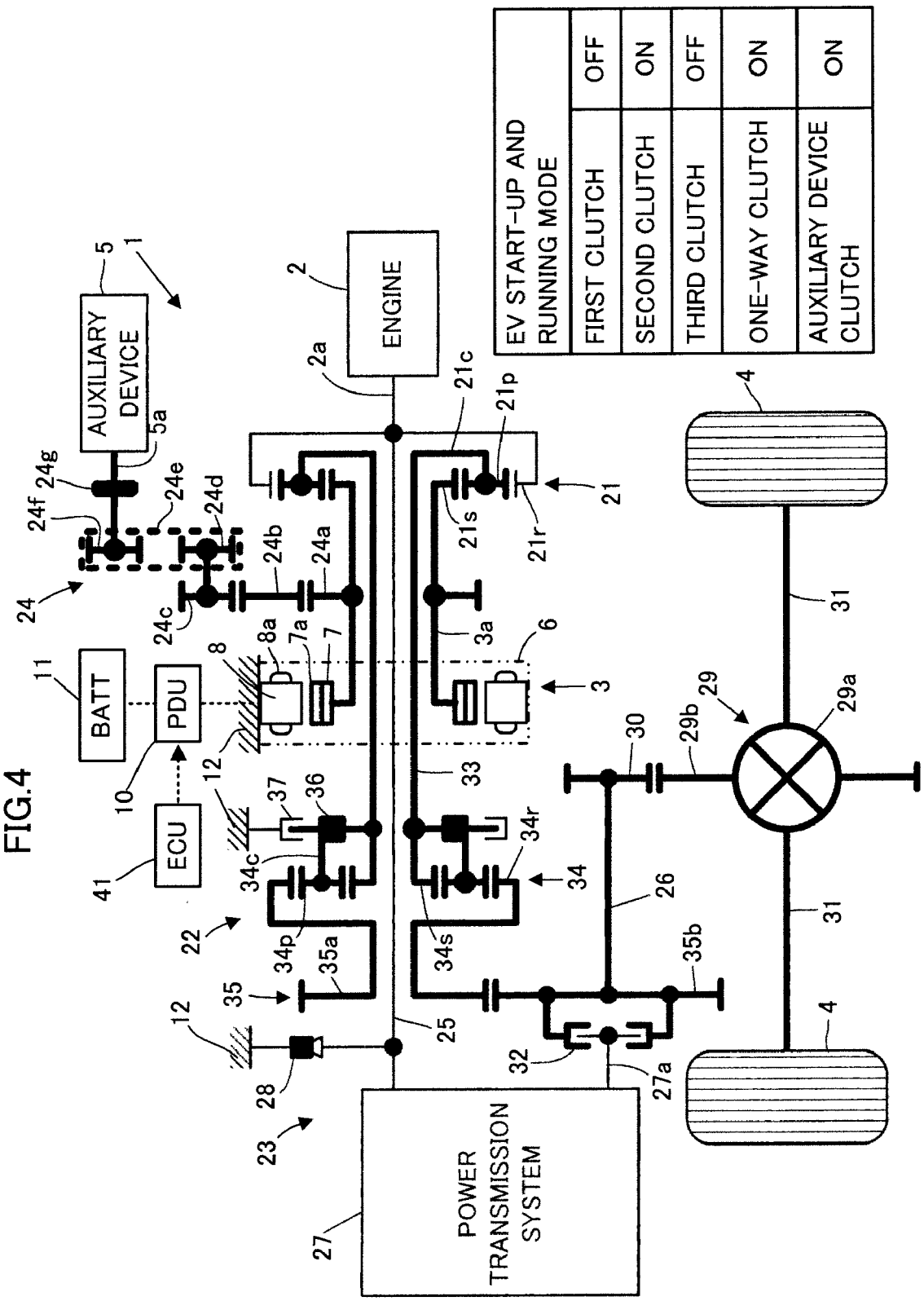
FIG. 4 is a diagram illustrating an operating state in an EV start-up and running mode of the power unit 1 according to the first embodiment.

FIG. 4 shows the operating state of the power unit 1 in an EV start-up and running mode. The EV start-up and running mode is an operation mode shifted from the stop-period idle stop mode. Further, the EV start-up and running mode is an operation mode where the start-up and running in the advance direction of the vehicle is performed only under the power of the motor 3 with the operation of the engine 2 stopped.

As shown, in the EV start-up and running mode, the ECU 41 places the first clutch 32 in the OFF state (maintains the first clutch 32 in the OFF state). Therefore, the power transmission via the second power transmission path 23 is disconnected between the output shaft 2a of the engine 2 (or the ring gear 21r of the first planetary gear unit 21) and the driving wheels 4, 4.

Further, the ECU 41 places the second clutch 36 and the third clutch 37 in the ON state and the OFF state, respectively. Specifically, the ECU 41 changes the operating state of the second clutch 36 from the OFF state, which is the operating state in the stop-period idle stop mode, to the ON state and maintains the operating state of the third clutch 37 in the operating state in the stop-period idle stop mode (the OFF state). Thereby, the operation mode of the second planetary gear unit 34 is set to the integral rotation mode. This provides a state for enabling power transmission between the carrier 21c of the first planetary gear unit 21 and the driving wheels 4, 4 via the first power transmission path 22.

In this instance, in the stop-period idle stop mode which is the operation mode immediately before the EV start-up and running mode, the carrier 21c of the first planetary gear unit 21, the fourth rotating shaft 33, and the sun gear 34s and the carrier 34c of the second planetary gear unit 34 idle-rotate during driving of the auxiliary device 5 by the power of the motor 3. If the second clutch 36 is changed from the OFF state to the ON state in this condition (if the operation mode of the second planetary gear unit 34 is switched from the power transmission disabled mode to the integral rotation mode), a sudden braking force acts on rotating members such as the output shaft 3a of the motor 3 and the carrier 21c of the first planetary gear unit 21. Then, an instantaneous swing or any other shock caused thereby occurs.

Therefore, to change the second clutch 36 from the OFF state to the ON state, the ECU 41 first controls the PDU 10 to stop the rotation of the rotor 7 of the motor 3 with the second clutch 36 and the third clutch 37 maintained in the OFF state. This temporarily stops the rotations of the carrier 21c of the first planetary gear unit 21, the fourth rotating shaft 33, and the sun gear 34s and the carrier 34c of the second planetary gear unit 34. The ECU 41 then changes the second clutch 36 from the OFF state to the ON state with the third clutch 37 maintained in the OFF state in the rotation stopped state to switch the operation mode of the second planetary gear unit 34 from the power transmission disabled mode to the integral rotation mode. Thereby, the above shock is prevented from occurring.

In the EV start-up and running mode, with the operation of the engine 2 stopped in the state where the first to third clutches 32, 36, and 37 are placed as described above, the power of the motor 3 drives the driving wheels 4, 4 (start-up and running in the advance direction of the vehicle) and the auxiliary device 5 as described below. Specifically, the ECU 41 places the auxiliary device clutch 24g in the ON state. Further, the ECU 41 controls the PDU 10 to cause the motor 3 to perform power running where the rotor 7 of the motor 3 rotates in the forward rotation direction. In this instance, similarly to the stop-period idle stop mode, the one-way clutch 28 is brought into the ON state, which prevents the output shaft 2a of the engine 2, the ring gear 21r of the first planetary gear unit 21, and the first rotating shaft 25 from rotating in the reverse rotation direction (maintains them in the rotation stopped state).

As a result, the power (power running torque) generated by the motor 3 is transmitted from the rotor 7 and the output shaft 3a to the driving wheels 4, 4 via the sun gear 21s and the carrier 21c of the first planetary gear unit 21 and the first power transmission path 22. Further, the power is also transmitted to the input shaft 5a of the auxiliary device 5 via the auxiliary device power transmission path 24. Thereby, the power of the motor 3 drives the driving wheels 4, 4 in the advance direction of the vehicle to perform the start-up and running of the vehicle and to drive the auxiliary device 5. The power running torque generated by the motor 3 in this case is controlled according to the depressing amount of an accelerator pedal (not shown) of the vehicle (according to a required driving force of the vehicle).

[Post-EV Engine Start Mode]

Figure 5:
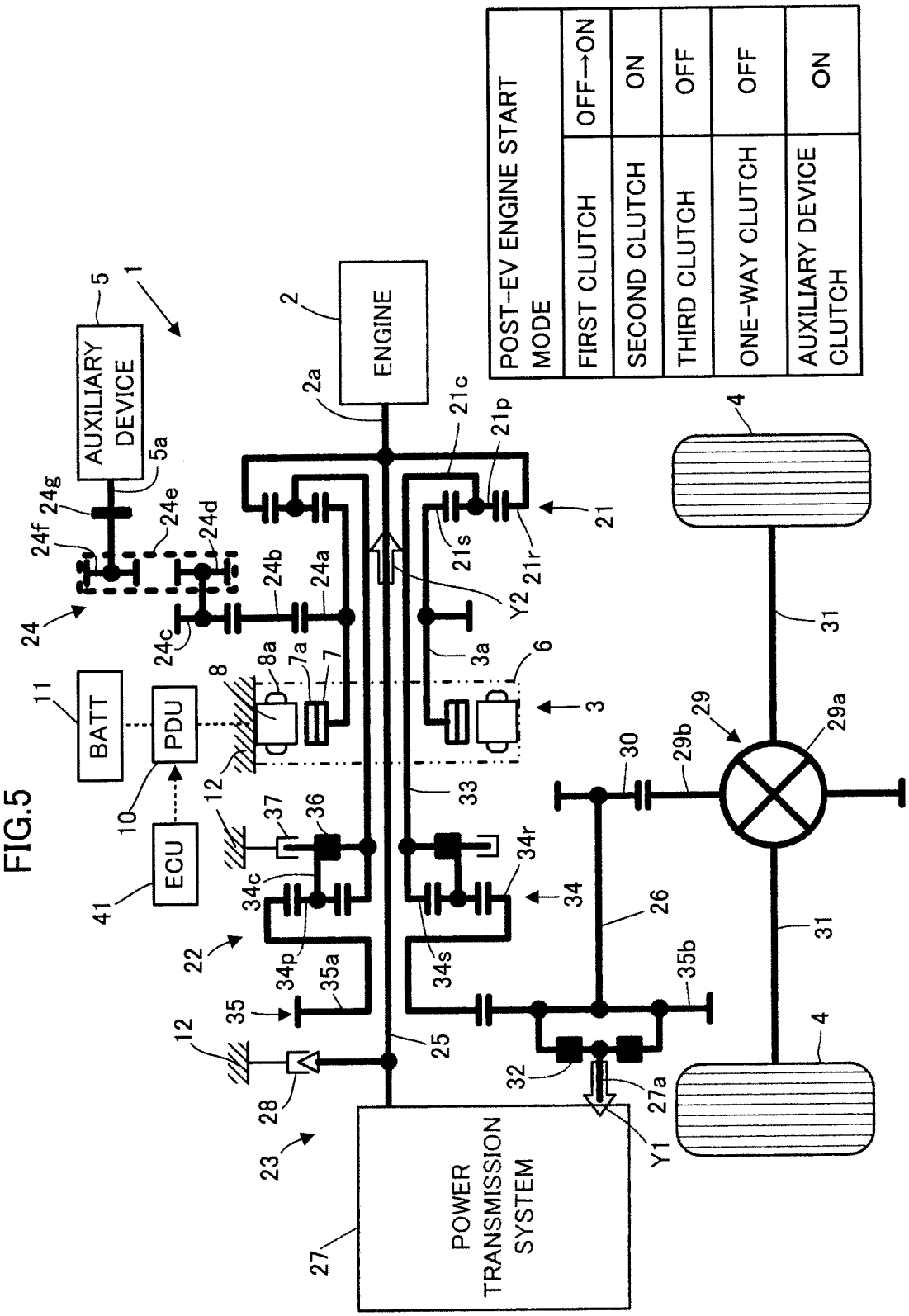
FIG. 5 is a diagram illustrating an operating state in a post-EV engine start mode of the power unit 1 according to the first embodiment.

FIG. 5 shows the operating state of the power unit 1 in a post-EV engine start mode. The post-EV engine start mode is an operation mode shifted from the EV start-up and running mode. Moreover, the post-EV engine start mode is an operation mode in which the engine 2 is started while the driving wheels 4, 4 (vehicle running in the advance direction) are driven by the power of the motor 3.

As shown, in the post-EV engine start mode, the ECU 41 places the second clutch 36 and the third clutch 37 in the ON state and the OFF state which are the same operating states as in the EV start-up and running mode, respectively. Therefore, the operation mode of the second planetary gear unit 34 is maintained in the integral rotation mode.

Then, the ECU 41 causes the first clutch 32 to operate so that the operating state thereof gradually changes from the OFF state to the ON state while causing the motor 3 to generate power (power running torque) for running the vehicle (while performing power running of the motor 3). In other words, the ECU 41 causes the first clutch 32 to operate in such a way as to be switched from the OFF state to the ON state through so-called a half-clutch state.

In this condition, along with the shift of the first clutch 32 from the OFF state to the ON state, a part of the power (power running torque) of the motor 3, which is transmitted from the rotor 7 and the output shaft 3a of the motor 3 to the driving wheels 4, 4 via the sun gear 21s and the carrier 21c of the first planetary gear unit 21 and the first power transmission path 22, is transmitted from the first clutch 32 to the output shaft 2a of the engine 2 via the power transmission system 27 and the first rotating shaft 25 (via a portion other than the shared power transmission path out of the second power transmission path 23), as indicated by white arrows Y1 and Y2 in FIG. 5. In this case, the torque transmitted to the output shaft 2a of the engine 2 is a torque for rotationally driving the output shaft 2a in the forward rotation direction. Therefore, the one-way clutch 28 is brought into the OFF state. Thereby, the output shaft 2a of the engine 2 is rotationally driven in the forward rotation direction to perform so-called cranking of the output shaft 2a. In this case, the ECU 41 maintains the rotational speed of the output shaft 2a of the engine 2 at a predetermined rotational speed for starting by controlling both or one of the change gear ratio of the CVT 27c provided in the power transmission system 27 and the rotational speed of the rotor 7 of the motor 3 according to the rotational speed of the driving wheels 4, 4 (or the vehicle speed).

The ECU 41 then starts the engine 2 by performing start processing including the control processing of the fuel supply and ignition of the engine 2 while cranking the output shaft 2a of the engine 2 as described above.

Moreover, in the post-EV engine start mode, the auxiliary device 5 is driven by the power of the motor 3 in the same manner as in the EV start-up and running mode. In other words, the ECU 41 places the auxiliary device clutch 24g in the ON state. In this condition, a part of the power (power running torque) of the motor 3 is transmitted to the input shaft 5a of the auxiliary device 5 via the auxiliary device power transmission path 24 and thereby the auxiliary device 5 is driven.

[Stop-Period Engine Start Mode]

Figure 6:
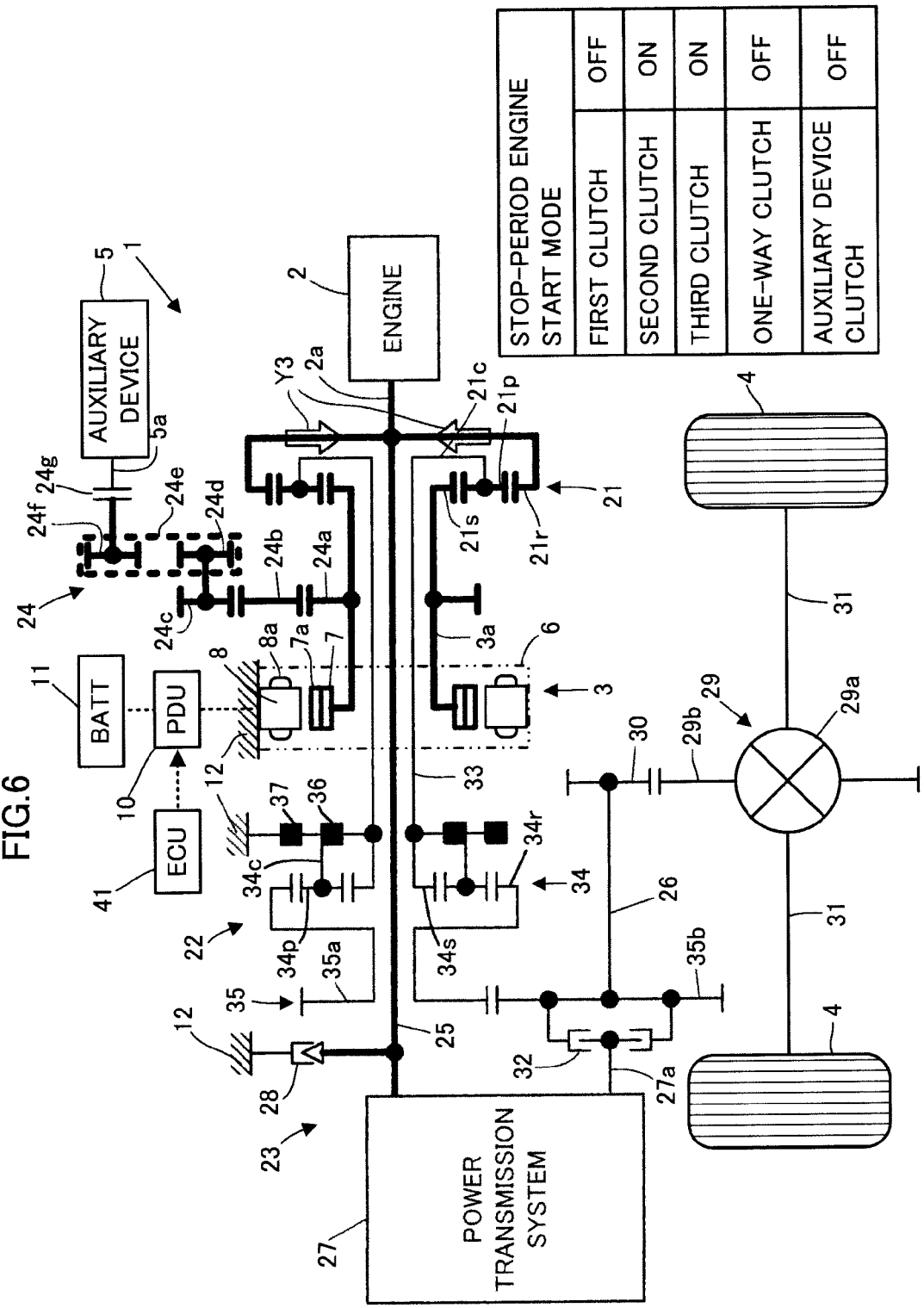
FIG. 6 is a diagram illustrating an operating state in a stop-period engine start mode of the power unit 1 according to the first embodiment.

FIG. 6 shows the operating state of the power unit 1 in a stop-period engine start mode. The stop-period engine start mode is an operation mode shifted from the stop-period idle stop mode. Moreover, the stop-period engine start mode is an operation mode in which the engine 2 is started in the vehicle stop state.

As shown, in the stop-period engine start mode, the ECU 41 places the first clutch 32 in the OFF state (maintains the first clutch 32 in the OFF state). Therefore, the power transmission between the output shaft 2a of the engine 2 (or the ring gear 21r of the first planetary gear unit 21) and the driving wheels 4, 4 via the second power transmission path 23 is maintained in the disconnected state.

Moreover, in the stop-period engine start mode, the rotor 7 and the output shaft 3a of the motor 3 are rotated in the reverse rotation direction as described later, and therefore the auxiliary device 5 is not able to be driven. On this account, the ECU 41 places the auxiliary device clutch 24g in the OFF state.

Further, the ECU 41 places both of the second clutch 36 and the third clutch 37 in the ON state. Therefore, the operation mode of the second planetary gear unit 34 is set to the non-rotatable mode.

For the same reason as the case where the second clutch 36 is changed from the OFF state to the ON state in the EV start-up and running mode, the second clutch 36 and the third clutch 37 are changed from the OFF state to the ON state after the stop of the rotation of the rotor 7 of the motor 3 (consequently, after the stop of the rotations of the carrier 21c of the first planetary gear unit 21, the fourth rotating shaft 33, and the sun gear 34s and the carrier 34c of the second planetary gear unit 34). Specifically, the ECU 41 first controls the PDU 10 to stop the rotation of the rotor 7 of the motor 3 with the second clutch 36 and the third clutch 37 maintained in the OFF state. This temporarily stops the rotations of the carrier 21c of the first planetary gear unit 21, the fourth rotating shaft 33, and the sun gear 34s and the carrier 34c of the second planetary gear unit 34. The ECU 41 then switches both of the second clutch 36 and the third clutch 37 from the OFF state to the ON state in the rotation stopped state and switches the operation mode of the second planetary gear unit 34 from the power transmission disabled mode to the non-rotatable mode.

Thereby, when the second clutch 36 and the third clutch 37 are changed from the OFF state to the ON state, a shock is prevented from occurring due to sudden braking of the output shaft 3a of the motor 3, the carrier 21c of the first planetary gear unit 21, or the like.

In the stop-period engine start mode, the ECU 41 controls the PDU 10 to cause the motor 3 to perform power running where the rotor 7 of the motor 3 rotates in the reverse rotation direction with the first to third clutches 32, 36, and 37 and the auxiliary device clutch 24g operated as described above. This rotationally drives the sun gear 21s of the first planetary gear unit 21 in the reverse rotation direction.

Since the operation mode of the second planetary gear unit 34 is the non-rotatable mode in the above condition, the carrier 21c of the first planetary gear unit 21 is maintained in the non-rotatable state (rotation stopped state). Therefore, the ring gear 21r of the first planetary gear unit 21 is rotationally driven in the reverse direction to the rotation direction of the sun gear 21s, that is, in the forward rotation direction, integrally with the output shaft 2a of the engine 2. In other words, as indicated by a white arrow Y3 in the figure, a torque in the forward rotation direction is transmitted from the rotor 7 and the output shaft 3a of the motor 3 to the output shaft 2a of the engine 2 via the first planetary gear unit 21. Thereby, the output shaft 2a of the engine 2 is cranked. In this case, the rotational speed of the rotor 7 of the motor 3 is controlled so that the rotational speed of the output shaft 2a of the engine 2 is maintained at a predetermined rotational speed for starting. In addition, the output shaft 2a of the engine 2 is rotationally driven in the forward rotation direction and therefore the one-way clutch 28 is brought into the OFF state.

The ECU 41 then starts the engine 2, in this way, by performing start processing including the control processing of the fuel supply and ignition of the engine 2 while causing the cranking of the output shaft 2a of the engine 2.

In the stop-period engine start mode, the start of the engine 2 is completed in a short time of only a few seconds, though the auxiliary device 5 is not able to be driven.

[Stop-Period Engine Idle Mode]

Figure 7:
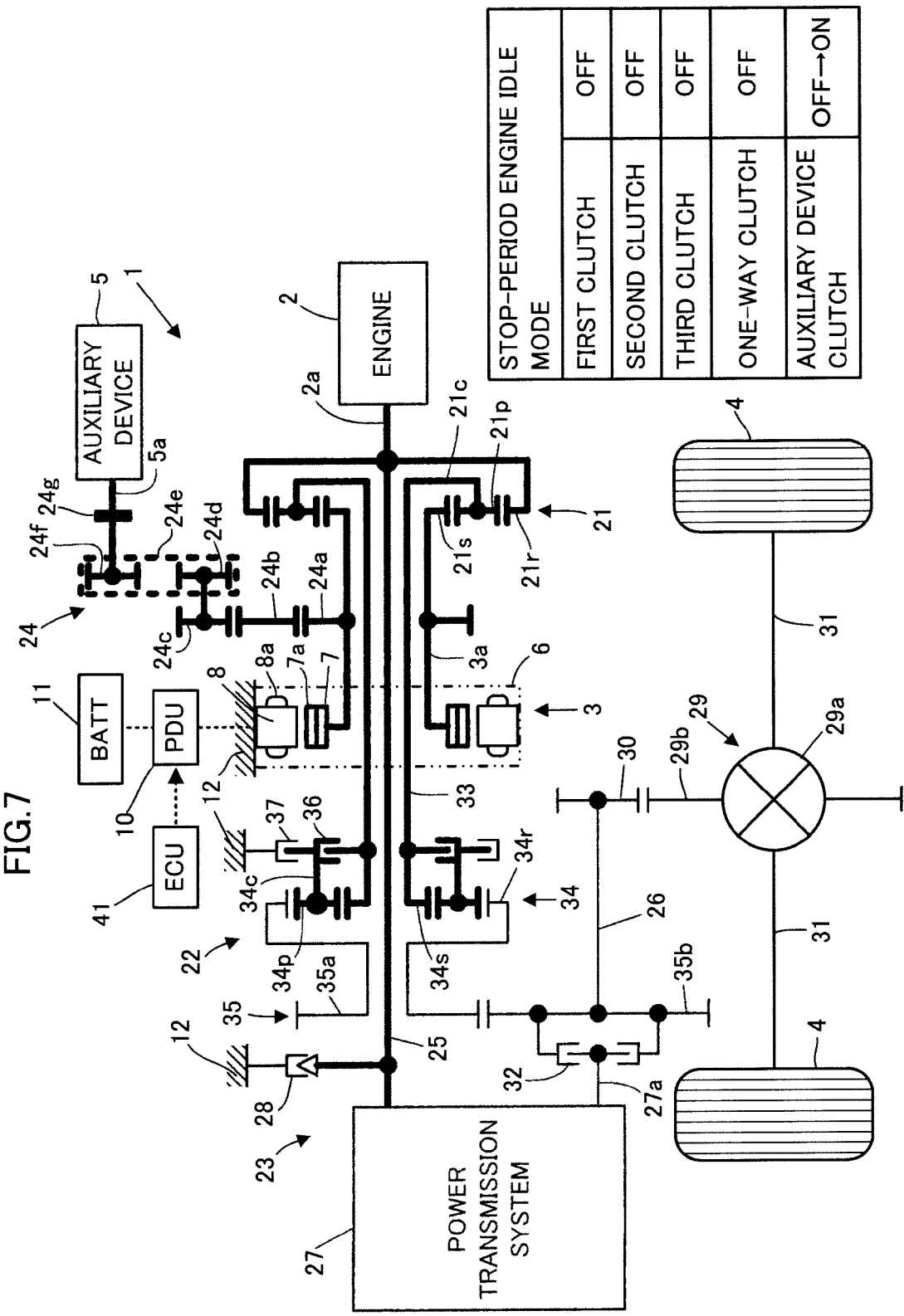
FIG. 7 is a diagram illustrating an operating state in a stop-period engine idle mode of the power unit 1 according to the first embodiment.

FIG. 7 shows the operating state of the power unit 1 in a stop-period engine idle mode. The stop-period engine idle mode is an operation mode shifted from the stop-period engine start mode or a stop-period engine idle charging mode described later. Moreover, the stop-period engine idle mode is an operation mode in which the auxiliary device 5 is driven during an idling operation of the engine 2 in the vehicle stop state.

As shown, in the stop-period engine idle mode, the ECU 41 places the first to the third clutches 32, 36, and 37 in the OFF state. This maintains the disconnected state of the power transmission between the output shaft 2a of the engine 2 (or the ring gear 21r of the first planetary gear unit 21) and the driving wheels 4, 4 via the second power transmission path 23. Moreover, the operation mode of the second planetary gear unit 34 is set to the power transmission disabled mode. This causes the disconnection of the power transmission between the carrier 21c of the first planetary gear unit 21 and the driving wheels 4, 4 via the first power transmission path 22.

The output shaft 2a of the engine 2 has already been rotating in the forward rotation direction and therefore the one-way clutch 28 is maintained in the OFF state.

Further, in order to drive the auxiliary device 5 by the power of the motor 3, the ECU 41 causes the auxiliary device clutch 24g to change from the OFF state to the ON state while controlling the operation of the motor 3 as described below. Specifically, the rotor 7 and the output shaft 3a of the motor 3 are rotating in the reverse rotation direction in the stop-period engine start mode or the stop-period engine idle charging mode described later immediately before the stop-period engine idle mode, and therefore the ECU 41 first controls the PDU 10 to cause the motor 3 to perform power running where the rotor 7 of the motor 3 rotates in the forward rotation direction with the operating state of the auxiliary device clutch 24g maintained in the OFF state.

Thereafter, upon the shift of the rotation direction of the rotor 7 of the motor 3 from the reverse rotation direction to the forward rotation direction, the ECU 41 causes the auxiliary device clutch 24g to change from the OFF state to the ON state. Thereby, the power of the motor 3 is transmitted to the input shaft 5a of the auxiliary device 5 via the auxiliary device power transmission path 24, by which the auxiliary device 5 is driven.

In the stop-period engine idle mode, the carrier 21c of the first planetary gear unit 21, the fourth rotating shaft 33, and the sun gear 34s and the carrier 34c of the second planetary gear unit 34 idle-rotate in conjunction with the rotations of the rotor 7 and the output shaft 3a of the motor 3.

[Stop-Period Engine Idle Charging Mode]

Figure 8:
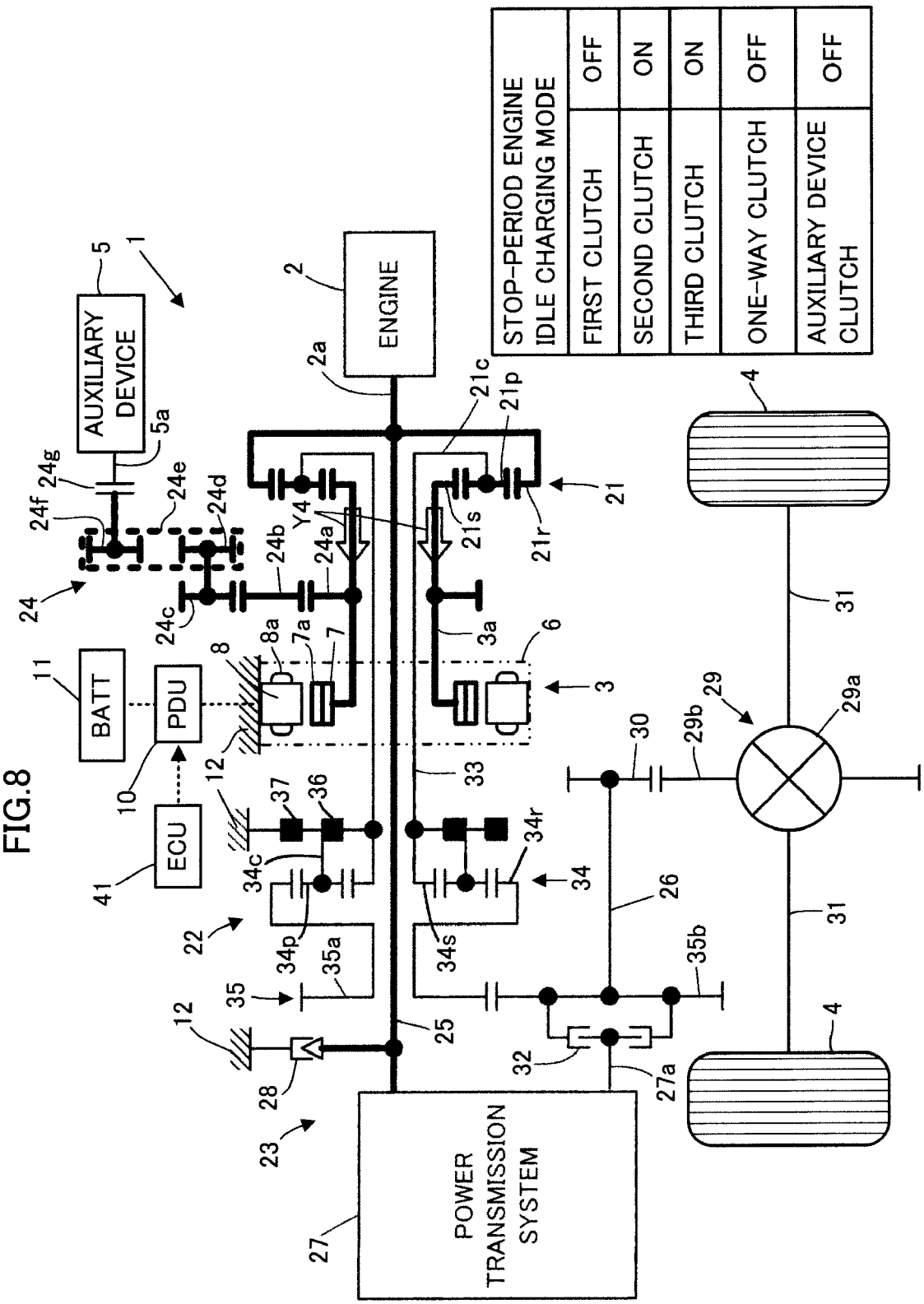
FIG. 8 is a diagram illustrating an operating state in a stop-period engine idle charging mode of the power unit 1 according to the first embodiment.

FIG. 8 shows the operating state of the power unit 1 in a stop-period engine idle charging mode. The stop-period engine idle charging mode is an operation mode shifted from the stop-period engine start mode or the stop-period engine idle mode in the case where the remaining capacity of the battery 11 is relatively low (in the case where the remaining capacity is equal to or less than a predetermined threshold value). Moreover, the stop-period engine idle charging mode is an operation mode in which the regeneration of the motor 3 is performed by the power of the engine 2 in the vehicle stop state to charge the battery 11.

As shown, in the stop-period engine idle charging mode, the ECU 41 places the first to third clutches 32, 36, and 37 and the auxiliary device clutch 24g in the same operating states as in the stop-period engine start mode. Specifically, the ECU 41 places the first to third clutches 32, 36, and 37 in the OFF state, the ON state, and the ON state, respectively, and places the auxiliary device clutch 24g in the OFF state. This maintains the disconnected state of the power transmission between the output shaft 2a of the engine 2 (or the ring gear 21r of the first planetary gear unit 21) and the driving wheels 4, 4 via the second power transmission path 23. Moreover, the operation mode of the second planetary gear unit 34 is set to the non-rotatable mode. The output shaft 2a of the engine 2 has already been rotating in the forward rotation direction, and therefore the one-way clutch 28 is maintained in the OFF state.

In this condition, if the operation mode immediately before the stop-period engine idle charging mode is the stop-period engine idle mode, for the same reason as the change operation of the second clutch 36 from the OFF state to the ON state in the EV start-up and running mode, the change operation of the second clutch 36 and the third clutch 37 from the OFF state to the ON state is performed after the stop of the rotation of the carrier 21c of the first planetary gear unit 21. Specifically, the ECU 41 first places the auxiliary device clutch 24g in the OFF state and then controls the PDU 10 to cause the motor 3 to perform power running where the rotor 7 of the motor 3 rotates in the reverse rotation direction with the second clutch 36 and the third clutch 37 maintained in the OFF state. In this operation, the ECU 41 controls the rotational speed of the rotor 7 of the motor 3 so that the rotational speed of the carrier 21c of the first planetary gear unit 21 goes to zero. The rotational speed of the rotor 7 of the motor 3 (=the rotational speed of the sun gear 21s), which is obtained when the rotational speed of the carrier 21c of the first planetary gear unit 21 is zero, is uniquely determined according to the rotational speed of the output shaft 2a of the engine 2 (=the rotational speed of the ring gear 21r) on the basis of the collinear relationship of the first planetary gear unit 21. Then, the ECU 41 switches the operation mode of the second planetary gear unit 34 from the power transmission disabled mode to the non-rotatable mode by causing the second clutch 36 and the third clutch 37 to change from the OFF state to the ON state in the state where the rotational speed of the carrier 21c is zero (the state where the rotations of the fourth rotating shaft 33 and the sun gear 34s and the carrier 34c of the second planetary gear unit 34 are stopped). This prevents an occurrence of a shock caused by sudden braking of the carrier 21c of the first planetary gear unit 21 or the like when the second clutch 36 and the third clutch 37 are changed from the OFF state to the ON state. After the change operation of the second clutch 36 and the third clutch 37 to the ON state, the power running of the motor 3 is stopped.

In the stop-period engine idle charging mode, the operation mode of the second planetary gear unit 34 is set to the non-rotatable mode as described above and therefore the carrier 21c of the first planetary gear unit 21 is placed in the non-rotatable mode (rotation stopped state). As a result, the power of the engine 2 during idling is transmitted from the output shaft 2a of the engine 2 to the output shaft 3a and the rotor 7 of the motor 3 via the first planetary gear unit 21 as indicated by a white arrow Y4 in the figure. In this instance, the power (torque) transmitted to the rotor 7 of the motor 3 is a torque in the reverse rotation direction and therefore the rotor 7 of the motor 3 is rotationally driven in the reverse rotation direction by the power of the engine 2 during idling.

The ECU 41 then controls the PDU 10 to perform the regeneration of the motor 3 with the rotor 7 of the motor 3 rotationally driven in the reverse rotation direction by the power of the engine 2 as described above. Thereby, the power energy of the motor 3 is charged to the battery 11 via the PDU 10.

In the stop-period engine idle charging mode, the auxiliary device 5 is not able to be driven, but it is possible to sufficiently secure opportunities of enabling the auxiliary device 5 to be driven by alternately and periodically performing the operation of the power unit 1 in the stop-period engine idle mode where the auxiliary device 5 is able to be driven and the operation of the power unit 1 in the stop-period engine idle charging mode.

[Engine Drive Start-Up Mode]

Figure 9:
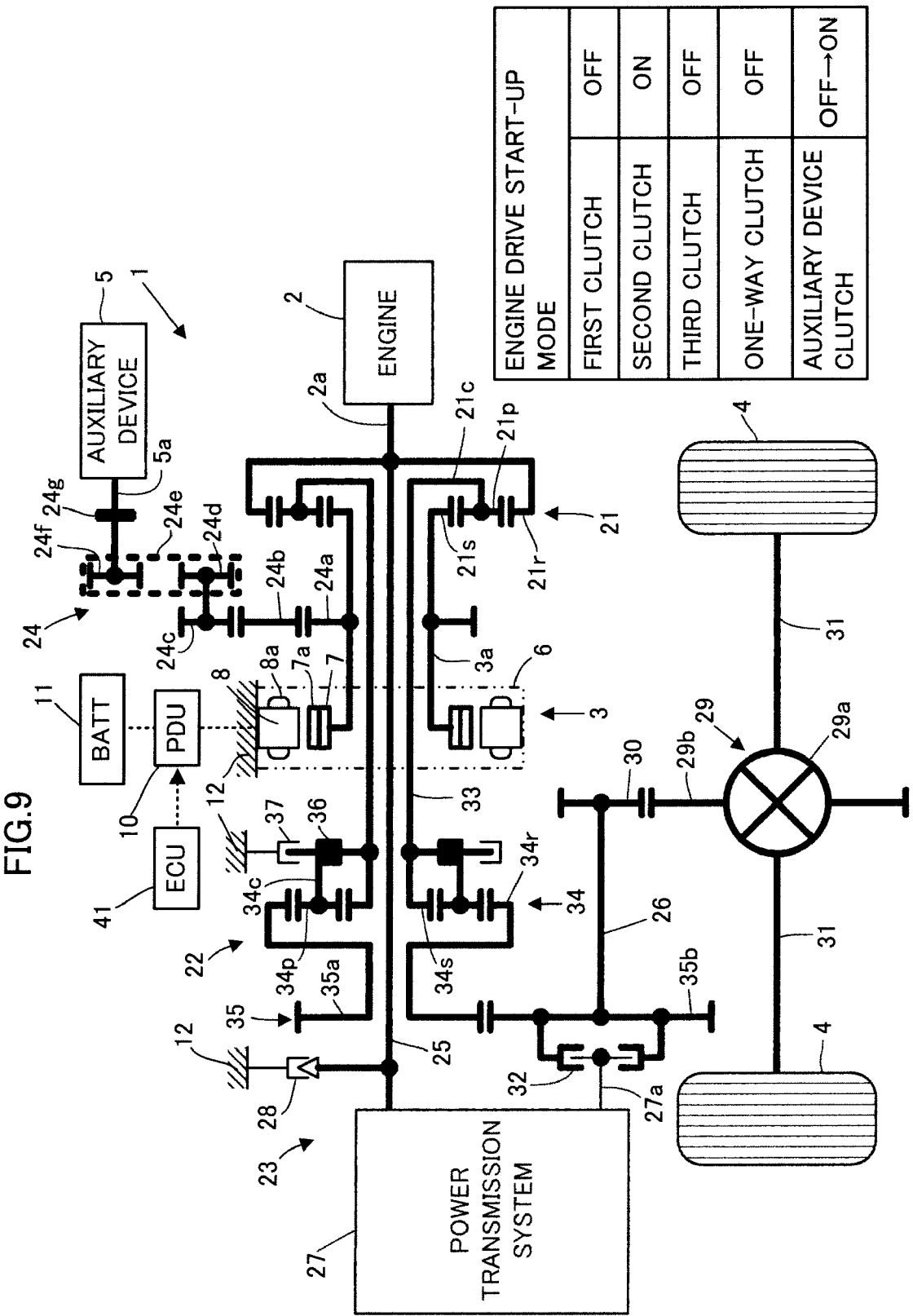
FIG. 9 is a diagram illustrating an operating state in an engine drive start-up mode of the power unit 1 according to the first embodiment.

FIG. 9 shows the operating state of the power unit 1 in an engine drive start-up mode. The engine drive start-up mode is an operation mode shifted from the stop-period engine idle mode or the stop-period engine idle charging mode. Moreover, the engine drive start-up mode is an operation mode where the vehicle is started up in the advance direction by using the power of the engine 2.

As shown, in the engine drive start-up mode, the ECU 41 places the first to third clutches 32, 36, and 37 in the OFF state, the ON state, and the OFF state, respectively. This maintains the disconnected state of the power transmission between the output shaft 2a of the engine 2 and the driving wheels 4, 4 via the second power transmission path 23. The operation mode of the second planetary gear unit 34 is set to the integral rotation mode. This enables the power transmission between the carrier 21c of the first planetary gear unit 21 and the driving wheels 4, 4.

In this instance, if the operation mode immediately before the engine drive start-up mode is the stop-period engine idle mode, the change operation of the second clutch 36 from the OFF state to the ON state (switching the operation mode of the second planetary gear unit 34 from the power transmission disabled mode to the integral rotation mode) is performed after the stop of the rotation of the carrier 21c of the first planetary gear unit 21. In this case, the control of stopping the rotation of the carrier 21c of the first planetary gear unit 21 (the control of causing the rotational speed of the carrier 21c to be zero) is performed in the same method as in the stop-period engine idle charging mode after the auxiliary device clutch 24g is placed in the OFF state. This prevents an occurrence of a shock caused by sudden braking of the carrier 21c of the first planetary gear unit 21 or the like when the second clutch 36 is changed from the OFF state to the ON state (when the operation mode of the second planetary gear unit 34 is switched from the power transmission disabled mode to the integral rotation mode).

If the operation mode immediately before the engine drive start-up mode is the stop-period engine idle charging mode, all of the three rotating elements 34s, 34r, and 34c of the second planetary gear unit 34 are in the rotation stopped state, and therefore the ECU 41 immediately places the second clutch 36 and the third clutch 37 in the ON state and the OFF state, respectively, to set the operation mode of the second planetary gear unit 34 to the integral rotation mode. Moreover, the auxiliary device clutch 24g is maintained in the OFF state. Since the output shaft 2a of the engine 2 has already been rotating in the forward rotation direction, the one-way clutch 28 is maintained in the OFF state.

In the engine drive start-up mode, the carrier 21c of the first planetary gear unit 21 is in the rotation stopped state in the state immediately after the second clutch 36 and the third clutch 37 are operated in the OFF state as described above in the vehicle stop state. Therefore, the sun gear 21s of the first planetary gear unit 21 is rotating in the reverse rotation direction along with the rotor 7 of the motor 3. Then, in this state, the ECU 41 controls the PDU 10 to perform the regeneration of the motor 3 by the power of the engine 2 while controlling the power of the engine 2 according to the depressing amount of the accelerator pedal of the vehicle. In this case, the ECU 41 controls the PDU 10 to perform the regeneration of the motor 3 so that the rotational speed of the rotor 7 of the motor 3 goes to zero while gradually increasing the amount of power generation obtained by the regeneration of the motor 3.

Since the rotor 7 of the motor 3 is rotating in the reverse rotation direction in this condition, the regenerative torque supplied from the rotor 7 to the sun gear 21s of the first planetary gear unit 21 via the output shaft 3a is a torque in the forward rotation direction. Then, a torque in the forward rotation direction acts on the carrier 21c by a resultant force between the regenerative torque in the forward rotation direction supplied from the rotor 7 of the motor 3 to the sun gear 21s as described above and a torque in the forward rotation direction supplied from the output shaft 2a of the engine 2 to the ring gear 21r. Further, this torque is transmitted from the carrier 21c to the driving wheels 4, 4 via the first power transmission path 22. Thereby, the vehicle starts in the advance direction while the carrier 21c rotates in the forward rotation direction.

After the start of the vehicle running in the advance direction as described above, the rotational speed of the sun gear 21s of the first planetary gear unit 21 (=the rotational speed of the rotor 7 of the motor 3) decreases to zero, and thereupon the ECU 41 controls the PDU 10 to stop the regeneration of the motor 3 and to cause the motor 3 to perform power running where the rotor 7 of the motor 3 rotates in the forward rotation direction. Thereby, a power running torque in the forward rotation direction is supplied from the output shaft 3a of the motor 3 to the sun gear 21s of the first planetary gear unit 21. Then, a torque in the forward rotation direction subsequently acts on the carrier 21c by a resultant force between the power running torque in the forward rotation direction supplied from the output shaft 3a of the motor 3 to the sun gear 21s as described above and the torque in the forward rotation direction supplied from the output shaft 2a of the engine 2 to the ring gear 21r. Further, this torque is transmitted from the carrier 21c to the driving wheels 4, 4 via the first power transmission path 22. Thereby, the vehicle running in the advance direction is continued. In this case, a power running torque generated in the output shaft 3a of the motor 3 is controlled so as to be balanced with the torque supplied from the output shaft 2a of the engine 2 to the sun gear 21s via the ring gear 21r and the planetary gear 21p. The rotational speed of the rotor 7 of the motor 3 is controlled according to the rotational speed of the output shaft 2a of the engine 2 and the rotational speed of the driving wheels 4, 4 (or the vehicle speed).

As described above, the start-up and running of the vehicle is performed by using the power of the engine 2 in the engine drive start-up mode.

In the engine drive start-up mode, the reduction ratio between the output shaft 2a of the engine 2 and the carrier 21c of the first planetary gear unit 21 is changed by adjusting the rotational speed of the rotor 7 of the motor 3. Consequently, the reduction ratio (change gear ratio) between the output shaft 2a of the engine 2 and the driving wheels 4, 4 is changed.

Moreover, in the engine drive start-up mode, the ECU 41 places the auxiliary device clutch 24g in the OFF state in the state where the rotation direction of the output shaft 3a of the motor 3 is the reverse rotation direction. On the other hand, if the rotation direction of the output shaft 3a changes to the forward rotation direction, the ECU 41 places the auxiliary device clutch 24g in the ON state. Thereby, a part of the power of the engine 2 is transmitted to the input shaft 5a of the auxiliary device 5 via the auxiliary device power transmission path 24 and then the auxiliary device 5 is driven.

[Engine Running Mode]

Figure 10:
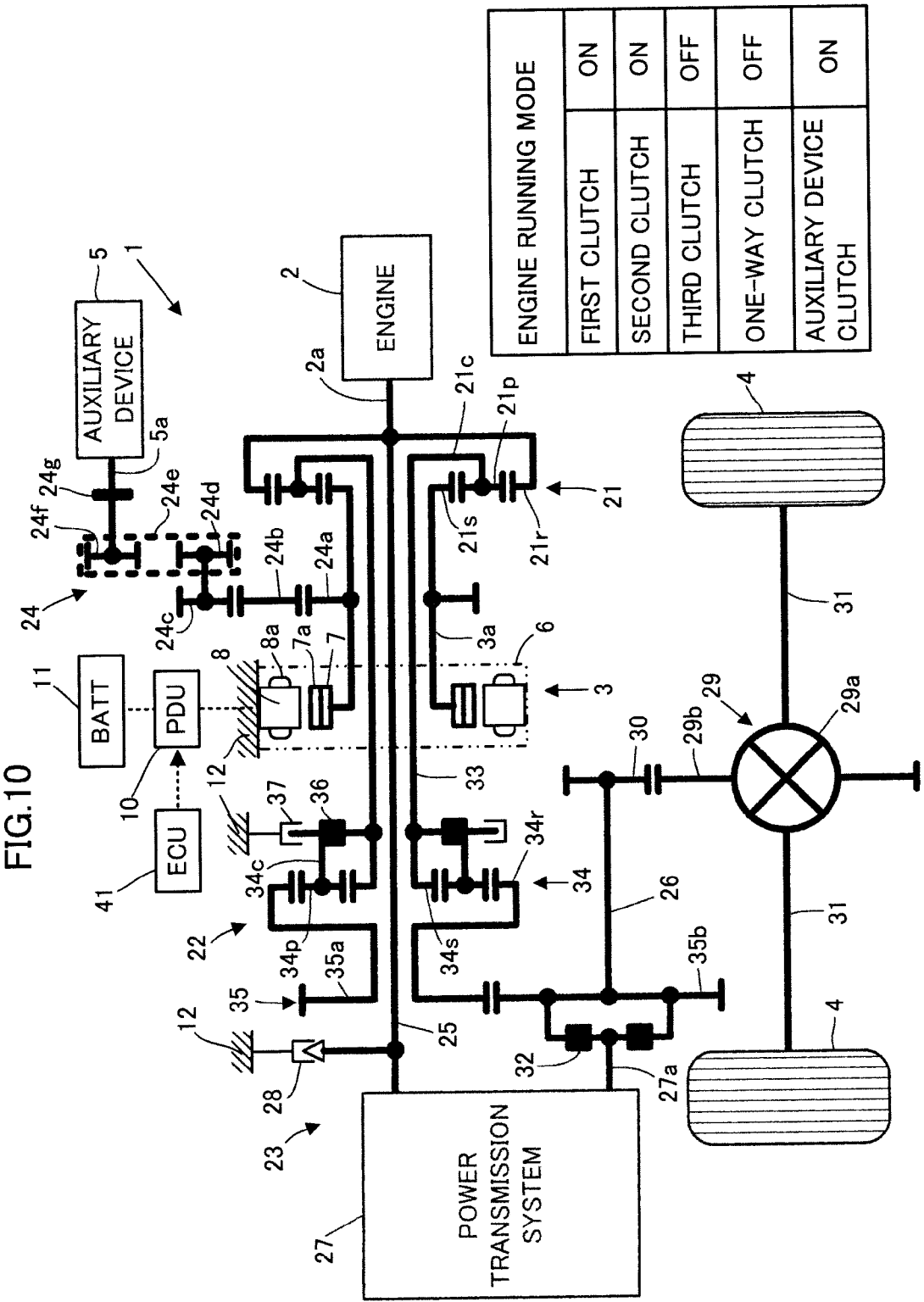
FIG. 10 is a diagram illustrating an operating state in an engine running mode of the power unit 1 according to the first embodiment.

FIG. 10 shows the operating state of the power unit 1 in an engine running mode. The engine running mode is an operation mode shifted from the post-EV engine start mode or the engine drive start-up mode. Moreover, the engine running mode is an operation mode where the power of the engine 2 is transmitted to the driving wheels 4, 4 mainly via the second power transmission path 23 to perform the vehicle running in the advance direction.

As shown, in the engine running mode, the ECU 41 places the first clutch 32 in the ON state. This enables the power transmission between the output shaft 2a of the engine 2 and the driving wheels 4, 4 via the second power transmission path 23.

In the above, if the operation mode immediately before the engine running mode is the engine drive start-up mode, the first clutch 32 is changed from the OFF state to the ON state. If the operation mode immediately before the engine running mode is the post-EV engine start mode, the first clutch 32 is maintained in the ON state which is the same operating state as in the post-EV engine start mode.

Further, the ECU 41 maintains the second clutch 36 and the third clutch 37 in the ON state and the OFF state, respectively, which are the same operating states as in the post-EV engine start mode or the engine drive start-up mode. Therefore, the operation mode of the second planetary gear unit 34 is maintained in the integral rotation mode.

In the engine running mode, the ECU 41 controls the power of the engine 2 and the change gear ratio of the CVT 27c of the power transmission system 27 of the second power transmission path 23 according to the depressing amount of the accelerator pedal, the rotational speed of the driving wheels 4, 4 (or the vehicle speed), or the like with the first to third clutches 32, 36, and 37 operated in the operating states as described above.

In this condition, the power of the engine 2 is transmitted from the output shaft 2a of the engine 2 to the driving wheels 4, 4 via the second power transmission path 23, and the driving wheels 4, 4 are driven in the advance direction of the vehicle.

Moreover, in the engine running mode, the ECU 41 places the auxiliary device clutch 24g in the ON state. Thereby, a part of the power of the engine 2 is transmitted to the input shaft 5a of the auxiliary device 5 via the first planetary gear unit 21, the output shaft 3a of the motor 3, and the auxiliary device power transmission path 24, and the auxiliary device 5 is driven by the power of the engine 2.

In this embodiment, the rotational speed of the carrier 21c of the first planetary gear unit 21 is uniquely determined according to the rotational speed of the driving wheels 4, 4 (or the vehicle speed). Moreover, the rotational speed of the ring gear 21r is determined according to the rotational speed of the driving wheels 4, 4 (or the vehicle speed) and the change gear ratio of the change gear of the power transmission system 27. On this account, the rotation direction of the sun gear 21s of the first planetary gear unit 21 (=the rotation direction of the rotor 7 of the motor 3) is, in some cases, the reverse rotation direction due to depending on the rotational speed of the driving wheels 4, 4 (or the vehicle speed) and the change gear ratio of the change gear of the power transmission system 27. If that is the case, the auxiliary device 5 is not able to be driven and therefore the ECU 41 places the auxiliary device clutch 24g in the OFF state. In this embodiment, however, the rotation direction of the sun gear 21s of the first planetary gear unit 21 is prevented from being the reverse rotation direction during normal vehicle running in the engine running mode by appropriately presetting the gear ratio between the sun gear 21s and the ring gear 21r of the first planetary gear unit 21, the reduction ratio of the first power transmission path 22, the change gear area of the CVT 27c of the power transmission system 27, and the like.

In addition, in the engine running mode, the operation of the motor 3 may be stopped, though the power running or regeneration of the motor 3 may be performed if necessary. In this case, for example, if the required driving force of the vehicle according to the depressing amount of the accelerator pedal is greater than a predetermined value, the power running of the motor 3 enables the power of the engine 2 to be transmitted to the driving wheels 4, 4 via the second power transmission path 23 and further the power of the motor 3 to be transmitted from the rotor 7 and the output shaft 3a of the motor 3 to the driving wheels 4, 4 via the sun gear 21s and the carrier 21c of the first planetary gear unit 21 and the first power transmission path 22. Moreover, if the remaining capacity of the battery 11 is low (if the remaining capacity is equal to or lower than a predetermined threshold value), the regeneration of the motor 3 enables a part of the power of the engine 2 to be transmitted to the rotor 7 of the motor 3 via the first planetary gear unit 21 so as to generate electricity of the motor 3 (charging the battery 11). When the power running or regeneration of the motor 3 is performed in the engine running mode in this manner, a part of the power of the engine 2 is transmitted to the driving wheels 4, 4 via the second power transmission path 23. Moreover, the remainder of the power of the engine 2 is transmitted to the driving wheels 4, 4 via the first planetary gear unit 21 and the first power transmission path 22 or to the rotor 7 of the motor 3 via the first planetary gear unit 21.

Further, in the engine running mode, both of the second clutch 36 and the third clutch 37 may be placed in the OFF state (the operation mode of the second planetary gear unit 34 is set to the power transmission disabled mode). In this case, the power transmitted to the auxiliary device 5 is able to be adjusted by performing the power running or regeneration of the motor 3.

[Engine Drive Reverse Mode]

Figure 11:
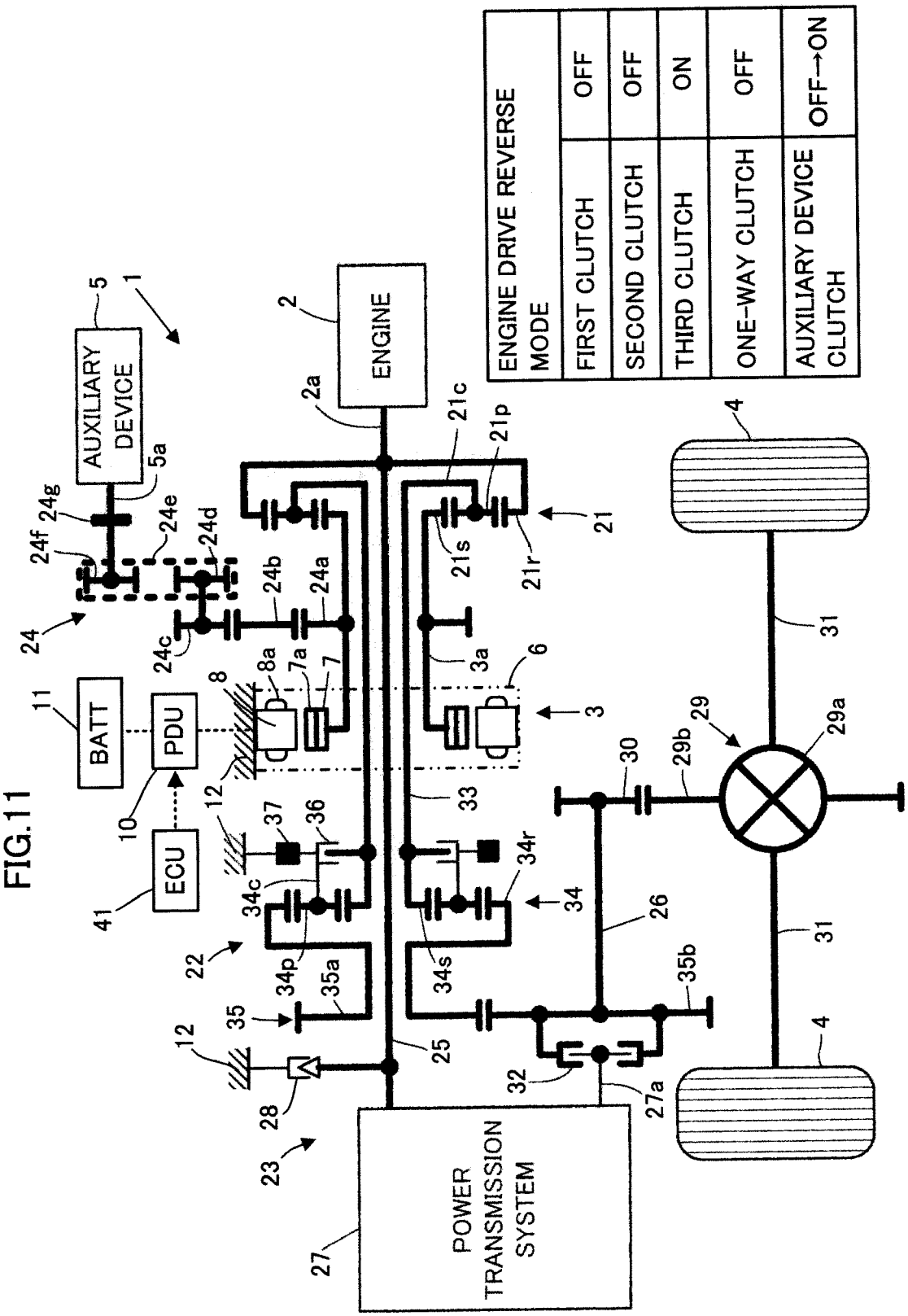
FIG. 11 is a diagram illustrating an operating state in an engine drive reverse mode of the power unit 1 according to the first embodiment.

FIG. 11 shows the operating state of the power unit 1 in an engine drive reverse mode. The engine drive reverse mode is an operation mode shifted from the stop-period engine idle mode or the stop-period engine idle charging mode. Moreover, the engine drive reverse mode is an operation mode where the vehicle is reversed by using the power of the engine 2.

The engine drive reverse mode is the operation mode different from the engine drive start-up mode only in the operating states of the second clutch 36 and the third clutch 37 (the operation mode of the second planetary gear unit 34).

Specifically, as shown, in the engine drive reverse mode, the ECU 41 places the first clutch 32 to in the same operating state (the OFF state) as in the engine drive start-up mode, while placing the second clutch 36 and the third clutch 37 in the OFF state and the ON state, respectively. Therefore, the operation mode of the second planetary gear unit 34 is set to the reverse rotation mode.

In this case, if the operation mode immediately before the engine drive reverse mode is the stop-period engine idle mode, the change operation of the third clutch 37 from the OFF state to the ON state (switching the operation mode of the second planetary gear unit 34 from the power transmission disabled mode to the reverse rotation mode) is performed after the stop of the rotation of the carrier 21c of the first planetary gear unit 21 with the auxiliary device clutch 24g placed in the OFF state, in the same manner as the change operation of the second clutch 36 from the OFF state to the ON state in the engine drive start-up mode.

The output shaft 2a of the engine 2 has already been rotating in the forward rotation direction and therefore the one-way clutch 28 is maintained in the OFF state.

Moreover, in the engine drive reverse mode, the ECU 41 controls the operations of the motor 3 and the engine 2, quite in the same manner as in the engine drive start-up mode, with the first to third clutches 32, 36, and 37 operated as described above. In this case, the rotation direction of the ring gear 34r of the second planetary gear unit 34 is reverse to the rotation direction of the sun gear 34s of the second planetary gear unit 34 and the carrier 21c of the first planetary gear unit 21, in other words, the rotation direction of the ring gear 34r is the reverse rotation direction. Therefore, the power transmitted from the output shaft 2a of the engine 2 to the driving wheels 4, 4 is power in the vehicle reversed direction (power in the reverse rotation direction of the driving wheels 4, 4). Thereby, the reverse running of the vehicle is performed.

Further, in the engine drive reverse mode, the ECU 41 places the auxiliary device clutch 24g in the OFF state in the state where the rotation direction of the output shaft 3a of the motor 3 is the reverse rotation direction in the same manner as in the engine drive start-up mode. On the other hand, if the rotation direction of the output shaft 3a changes to the forward rotation direction, the ECU 41 places the auxiliary device clutch 24g in the ON state. Thereby, a part of the power of the engine 2 is transmitted to the input shaft 5a of the auxiliary device 5 via the auxiliary device power transmission path 24 and then the auxiliary device 5 is driven.

Additionally, although the engine drive reverse mode is the operation mode where the vehicle is reversed by using the engine power, it is also possible to reverse the vehicle by using only the power of the motor 3. If that is the case, the second clutch 36 and the third clutch 37 are placed in the OFF state and the ON state, respectively, instead of placing the second clutch 36 and the third clutch 37 in the ON state and the OFF state in the EV start-up and running mode (the operation mode of the second planetary gear unit 34 is set to the reverse rotation mode instead of the integral rotation mode). Other operation controls are the same as those in the EV start-up and running mode.

As described above, according to the power unit 1 of this embodiment, the auxiliary device 5 is able to be driven by using the power of one of the engine 2 and the motor 3, which are power generation sources for driving the driving wheels 4, 4, without using an auxiliary device driving motor other than the motor 3 except a situation where the rotor 7 of the motor 3 and the sun gear 21s of the first planetary gear unit 21 rotate in the reverse rotation direction as in the stop-period engine start mode or the like. Furthermore, the situation where the auxiliary device 5 is not able to be driven due to the rotations of the rotor 7 of the motor 3 and the sun gear 21s of the first planetary gear unit 21 in the reverse rotation direction as in the stop-period engine start mode is a sufficiently short temporary situation. Therefore, the auxiliary device 5 is able to be driven by the power of the motor 3 or the engine 2 in almost all of the situations where the power unit 1 is operating (during vehicle operation).

Moreover, the second planetary gear unit 34 provided in the first power transmission path 22 enables power transmission via the first power transmission path 22 by the combination of the operating states of the second clutch 36 and the third clutch 37. Further, by the combination of the operating states of the second clutch 36 and the third clutch 37, the second planetary gear unit 34 implements a function of disconnecting the power transmission via the first power transmission path 22, a function of switching the rotation direction of the driving wheels 4, 4 rotated by the power transmitted via the first power transmission path 22 with the carrier 21c of the first planetary gear unit 21 rotationally driven in the forward rotation direction, and a function of non-rotatably locking the carrier 21c of the first planetary gear unit 21. Therefore, it is possible to operate the power unit 1 in various operation modes with the configuration of the power unit 1 simplified by decreasing the number of parts of the power unit 1.

Second Embodiment

The following describes a second embodiment of the present invention with reference to FIGS. 12 to 20. First, the configuration of a power unit 51 according to this embodiment will be described with reference to FIG. 12. The power unit 51 according to this embodiment is different from the power unit 1 according to the first embodiment only in a part of the configuration. Therefore, in the description of the configuration of the power unit 51 according to this embodiment, the same components as in the first embodiment are denoted by the same reference numerals as in the first embodiment and their description will be omitted.

Figure 12:
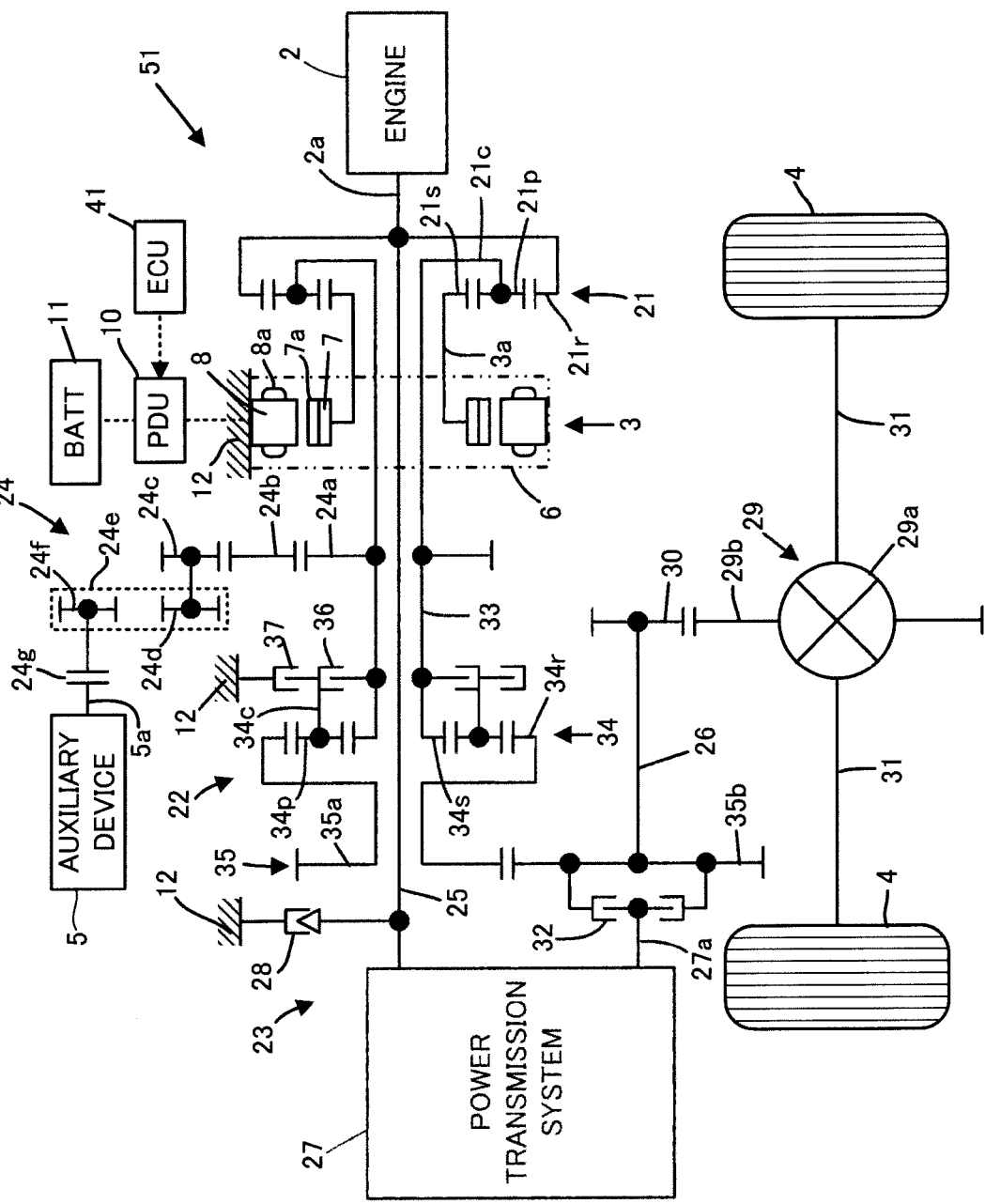
FIG. 12 is a diagram schematically illustrating the general configuration of a vehicle having a power unit 51 according to a second embodiment.

Referring to FIG. 12, the configuration of the power unit 51 according to this embodiment differs from that of the power unit 1 according to the first embodiment only in the parts related to the connection between the rotating elements of the first planetary gear unit 21 and the auxiliary device 5. Specifically, in the power unit 51 according to this embodiment, the auxiliary device 5 is connected to the carrier 21c, which is the remaining one rotating element (the third rotating element) other than the ring gear 21r connected to the output shaft 2a of the engine 2 and the sun gear 21s connected to the output shaft 3a of the motor 3 out of the three rotating elements 21s, 21r, and 21c of the first planetary gear unit 21, via the auxiliary device power transmission path 24 formed of the same components as in the first embodiment.

In this case, a gear 24a which is a component on the starting end side of the auxiliary device power transmission path 24 is fixed coaxially with the fourth rotating shaft 33 between the motor 3 and the second planetary gear unit 34. Thereby, in this embodiment, the carrier 21c of the first planetary gear unit 21 is connected to the auxiliary device 5 via the fourth rotating shaft 33 and the auxiliary device power transmission path 24. If the auxiliary device clutch 24g of the auxiliary device power transmission path 24 is placed in the ON state (connected state) in the above condition, power transmission is enabled between the carrier 21c of the first planetary gear unit 21 and the input shaft 5a of the auxiliary device 5 and therefore the carrier 21c and the input shaft 5a rotate in conjunction with each other. Consequently, power is able to be transmitted between the rotor 7 of the motor 3 and the auxiliary device 5 via the first planetary gear unit 21, the fourth rotating shaft 33, and the auxiliary device power transmission path 24. Alternatively, power is able to be transmitted between the output shaft 2a of the engine 2 and the auxiliary device 5 via the first planetary gear unit 21, the fourth rotating shaft 33, and the auxiliary device power transmission path 24.

The remaining parts of the configuration of the power unit 51 other than those described hereinabove are the same as those of the power unit 1 according to the first embodiment.

Subsequently, the operation of the power unit 51 of this embodiment will be described below. The operation modes of the power unit 51 according to this embodiment include a plurality of types of operation modes which are the same as those of the first embodiment except the stop-period engine idle charging mode. FIGS. 13 to 20 visually show the operating states of the power unit 51 in the various operation modes. In this case, similarly to the first embodiment, FIGS. 13 to 20 show the operating states of the first clutch 32, the second clutch 36, the third clutch 37, and the auxiliary device clutch 24g as follows: the clutches 32, 36, 37, and 24g are indicated by solid areas in the case where the operating states are the ON states (the connected states) and indicated by outlines in the case where the operating states are the OFF states (the disconnected state). Moreover, the operating state of the one-way clutch 28 is the same as in the first embodiment. In addition, in various operation modes, the components of the power unit 51 rotating in conjunction with each other are indicated by thick lines.

The meanings (functions) of the operation modes corresponding to FIGS. 13 to 20, respectively, are the same as those in the first embodiment. Moreover, the operation control methods of the first to third clutches 32, 36, and 37 in the various operation modes according to this embodiment are the same as those in the first embodiment. Therefore, the following description will focus on differences from the first embodiment and the detailed description is omitted regarding the same parts as in the first embodiment.

[Stop-Period Idle Stop Mode]

Figure 13:
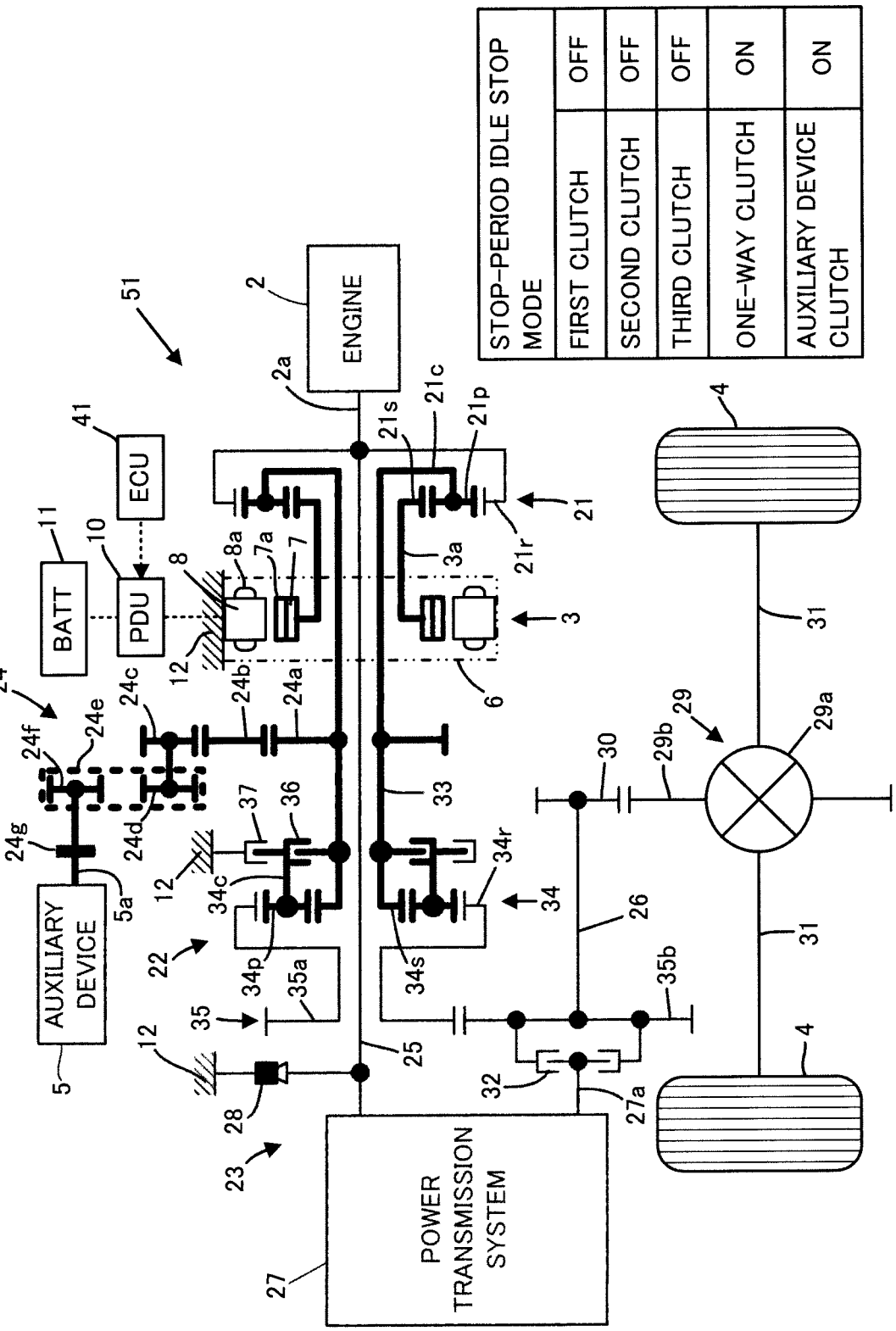
FIG. 13 is a diagram illustrating an operating state in a stop-period idle stop mode of the power unit 51 according to the second embodiment.

FIG. 13 shows the operating state of the power unit 51 in a stop-period idle stop mode. In the stop-period idle stop mode, the ECU 41 places the first to third clutches 32, 36, and 37 in the same operating states as in the first embodiment (all in the OFF states) as shown. This disconnects the power transmission between the output shaft 2a of the engine 2 and the driving wheels 4, 4 via the second power transmission path 23. Moreover, the operation mode of the second planetary gear unit 34 is set to the power transmission disabled mode.

Further, in the stop-period idle stop mode, the ECU 41 causes the motor 3 to operate in the same manner as in the first embodiment with the auxiliary device clutch 24g placed in the ON state. Specifically, the ECU 41 controls the PDU 10 to cause the motor 3 to perform power running where the rotor 7 of the motor 3 rotates in the forward rotation direction. In this operation, the power (power running torque) generated by the motor 3 is transmitted from the rotor 7 and the output shaft 3a to the input shaft 5a of the auxiliary device 5 via the sun gear 21s and the carrier 21c of the first planetary gear unit 21, the fourth rotating shaft 33, and the auxiliary device power transmission path 24. Thereby, the auxiliary device 5 is driven by the power of the motor 3. In this case, similarly to the first embodiment, the one-way clutch 28 is brought into the ON state, which thereby prevents the output shaft 2a of the engine 2 and the ring gear 21r of the first planetary gear unit 21 from rotating in the reverse rotation direction (maintains them in the rotation stopped state).

[EV Start-Up and Running Mode]

Figure 14:
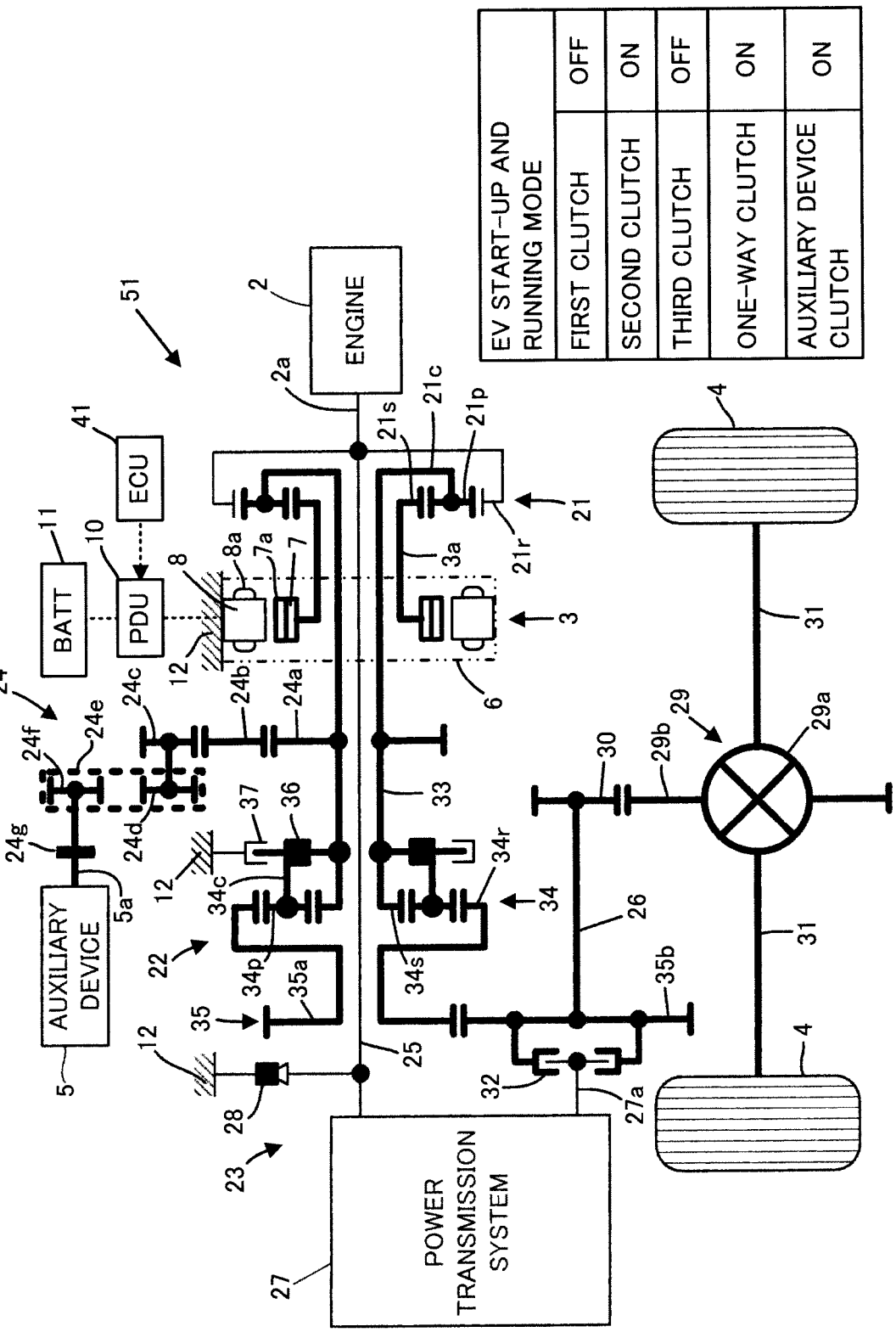
FIG. 14 is a diagram illustrating an operating state in an EV start-up and running mode of the power unit 51 according to the second embodiment.

FIG. 14 shows the operating state of the power unit 51 in an EV start-up and running mode shifted from the stop-period idle stop mode. In the EV start-up and running mode, the ECU 41 places the first to third clutches 32, 36, and 37 in the same operating states as in the first embodiment (the OFF state, the ON state, and the OFF state, respectively) as shown. This disconnects the power transmission between the output shaft 2a of the engine 2 and the driving wheels 4, 4 via the second power transmission path 23. Moreover, the operation mode of the second planetary gear unit 34 is set to the integral rotation mode.

In the same manner as in the EV start-up and running mode in the first embodiment, the ECU 41 controls the motor 3 to stop the rotation of the rotor 7 of the motor 3 and then changes the second clutch 36 from the OFF state to the ON state in the rotation stopped state, regarding the change operation of the second clutch 36 from the OFF state to the ON state. This prevents an occurrence of a shock caused by sudden braking of the output shaft 3a of the motor 3, the carrier 21c of the first planetary gear unit 21, or the like.

In the EV start-up and running mode, the ECU 41 controls the PDU 10 to cause the motor 3 to perform power running where the rotor 7 of the motor 3 rotates in the forward rotation direction in the same manner as in the first embodiment, with the auxiliary device clutch 24g placed in the ON state. In this condition, the one-way clutch 28 is brought into the ON state in the same manner as in the first embodiment, which prevents the output shaft 2a of the engine 2 and the ring gear 21r of the first planetary gear unit 21 from rotating in the reverse rotation direction (maintains them in the rotation stopped state).

Further, the power (power running torque) generated by the motor 3 is transmitted from the rotor 7 and the output shaft 3a to the driving wheels 4, 4 via the sun gear 21s and the carrier 21c of the first planetary gear unit 21 and the first power transmission path 22. Moreover, the power branches from the fourth rotating shaft 33 in the middle of the first power transmission path 22 and is also transmitted to the input shaft 5a of the auxiliary device 5 via the auxiliary device power transmission path 24. Thereby, the power of the motor 3 drives the driving wheels 4, 4 in the advance direction of the vehicle, by which the start-up and running of the vehicle is performed and the auxiliary device 5 is driven.

[Post-EV Engine Start Mode]

Figure 15:
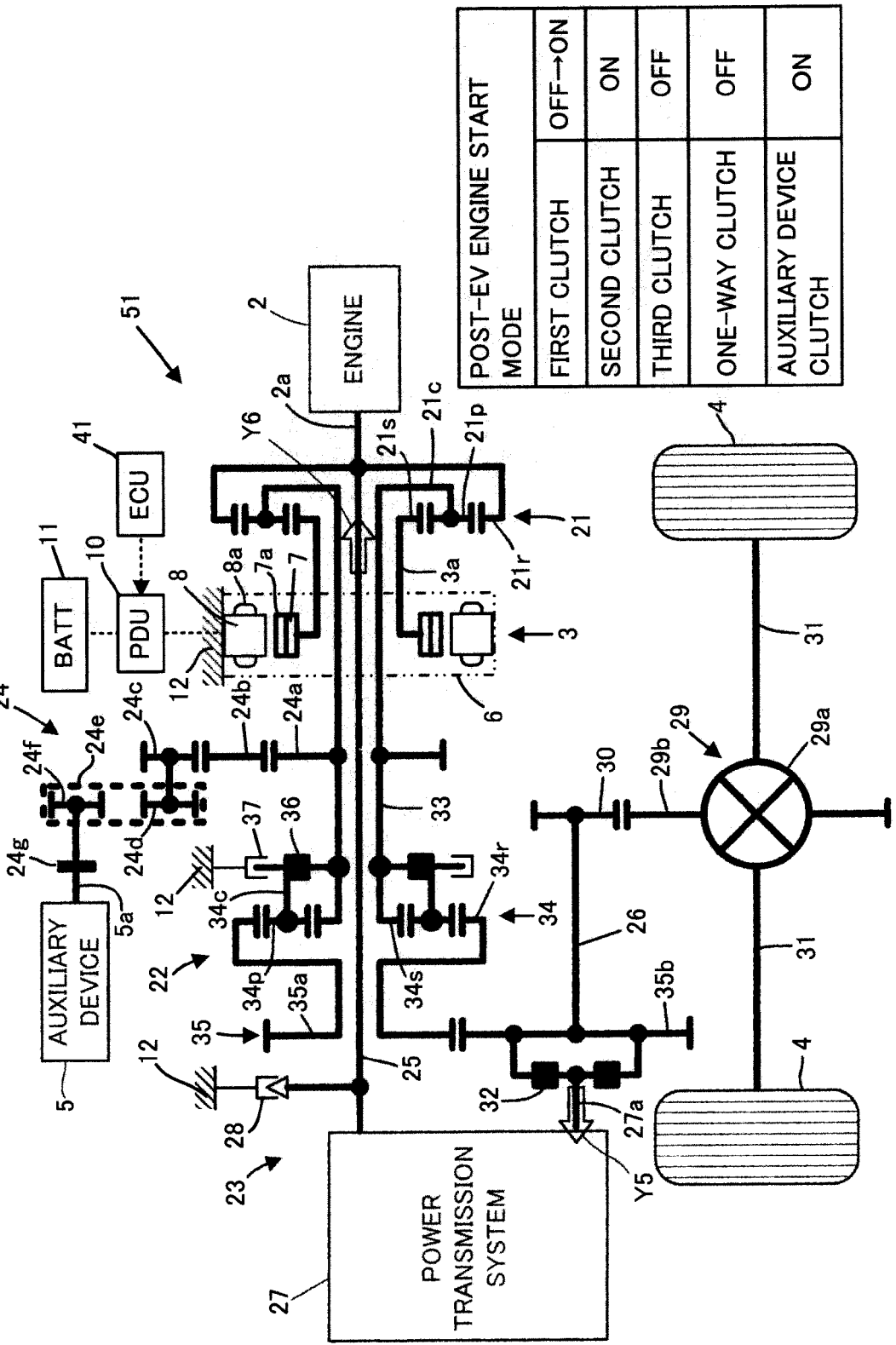
FIG. 15 is a diagram illustrating an operating state in a post-EV engine start mode of the power unit 51 according to the second embodiment.

FIG. 15 shows the operating state of the power unit 51 in a post-EV engine start mode shifted from the EV start-up and running mode. In the post-EV engine start mode, the ECU 41 places the second clutch 36 and the third clutch 37 in the same operation states as those in the first embodiment, respectively (in the ON state and the OFF state, respectively). Therefore, the operation mode of the second planetary gear unit 34 is set to the integral rotation mode. Moreover, in the same manner as in the first embodiment, the ECU 41 causes the first clutch 32 to operate so that the operating state thereof gradually changes from the OFF state to the ON state while causing the motor 3 to generate power (power running torque) for running the vehicle (while performing power running of the motor 3).

Thereby, in the same manner as in the first embodiment, a part of the power (power running torque) of the motor 3 is transmitted from the first clutch 32 to the output shaft 2a of the engine 2 via the power transmission system 27 and the first rotating shaft 25 as indicated by white arrows Y5 and Y6 in FIG. 15. Consequently, the engine 2 is cranked. In this case, similarly to the first embodiment, the ECU 41 maintains the rotational speed of the output shaft 2a of the engine 2 at a predetermined rotational speed for starting while matching the rotational speed of the carrier 21c of the first planetary gear unit 21 to the rotational speed of the driving wheels 4, 4 by controlling both or one of the change gear ratio of the change gear provided in the power transmission system 27 and the rotational speed of the output shaft 3a of the motor 3 according to the rotational speed of the driving wheels 4, 4 (or the vehicle speed). The one-way clutch 28 is brought into the OFF state in the same manner as in the first embodiment.

The ECU 41 then starts the engine 2 by performing start processing including the control processing of the fuel supply and ignition of the engine 2 while cranking the engine 2 as described above.

Moreover, in the post-EV engine start mode, the ECU 41 places the auxiliary device clutch 24g in the ON state. Thereby, a part of the power of the motor 3 is transmitted from the fourth rotating shaft 33 in the middle of the first power transmission path 22 to the input shaft 5a of the auxiliary device 5 via the auxiliary device power transmission path 24 and thereby the auxiliary device 5 is driven.

[Stop-Period Engine Start Mode]

Figure 16:
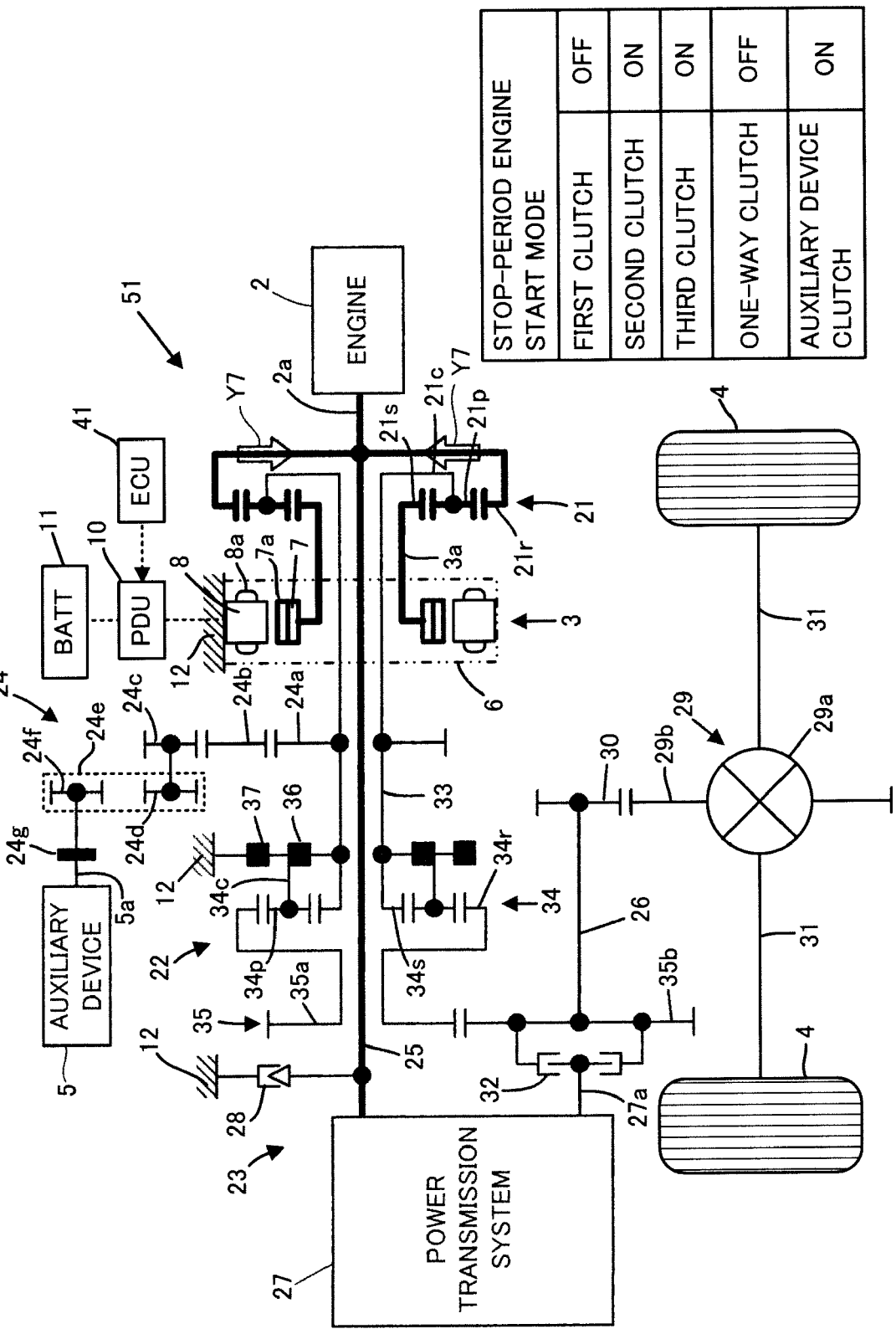
FIG. 16 is a diagram illustrating an operating state in a stop-period engine start mode of the power unit 51 according to the second embodiment.

FIG. 16 shows the operating state of the power unit 51 in a stop-period engine start mode shifted from the stop-period idle stop mode. In the stop-period engine start mode, the ECU 41 places the first to third clutches 32, 36, and 37 in the same operating states as in the first embodiment, respectively (the OFF state, the ON state, and the ON state, respectively) as shown. This disconnects the power transmission between the output shaft 2a of the engine 2 and the driving wheels 4, 4 via the second power transmission path 23. Moreover, the operation mode of the second planetary gear unit 34 is set to the non-rotatable mode.

In the same manner as in the stop-period engine start mode in the first embodiment, the ECU 41 controls the motor 3 to stop the rotation of the rotor 7 of the motor 3 and then causes the second clutch 36 and the third clutch 37 to change from the OFF state to the ON state in the rotation stopped state, regarding the change operation of the second clutch 36 and the third clutch 37 from the OFF state to the ON state. This prevents an occurrence of a shock caused by sudden braking of the output shaft 3a of the motor 3, the carrier 21c of the first planetary gear unit 21, or the like.

Further, in the stop-period engine start mode, the ECU 41 causes the motor 3 to operate in the same manner as in the first embodiment. Specifically, the ECU 41 controls the PDU 10 to cause the motor 3 to perform power running where the output shaft 3*a* of the motor 3 rotates in the reverse rotation direction.

In this operation, in the same manner as in the first embodiment, a torque in the forward rotation direction is transmitted from the output shaft 3*a* of the motor 3 to the output shaft 2*a* of the engine 2 via the first planetary gear unit 21 as indicated by a white arrow Y7 in FIG. 16. Thereby, the output shaft 2*a* of the engine 2 is cranked. In this case, the rotational speed of the output shaft 3*a* of the motor 3 is controlled so that the rotational speed of the output shaft 2*a* of the engine 2 is maintained at a predetermined rotational speed for starting. Moreover, the one-way clutch 28 is brought into the OFF state.

The ECU 41 then starts the engine 2 by performing start processing including the control processing of the fuel supply and ignition of the engine 2 while cranking the output shaft 2*a* of the engine 2 as described above.

In the stop-period engine start mode according to this embodiment, the carrier 21*c* of the first planetary gear unit 21 and the fourth rotating shaft 33 are non-rotatable (maintained in the rotation stopped state) and therefore the auxiliary device 5 is not able to be driven in the same manner as in the first embodiment. In this embodiment, however, the components of the auxiliary device power transmission path 24 are maintained in the rotation stopped state along with the fourth rotating shaft 33 in the stop-period engine start mode. Therefore, in the stop-period engine start mode, the auxiliary device clutch 24*g* need not be placed in the OFF state as in the first embodiment, but may be placed in either of the ON state and the OFF state. In the example shown in FIG. 16, the auxiliary device clutch 24*g* is placed in the ON state.

[Stop-Period Engine Idle Mode]

Figure 17:
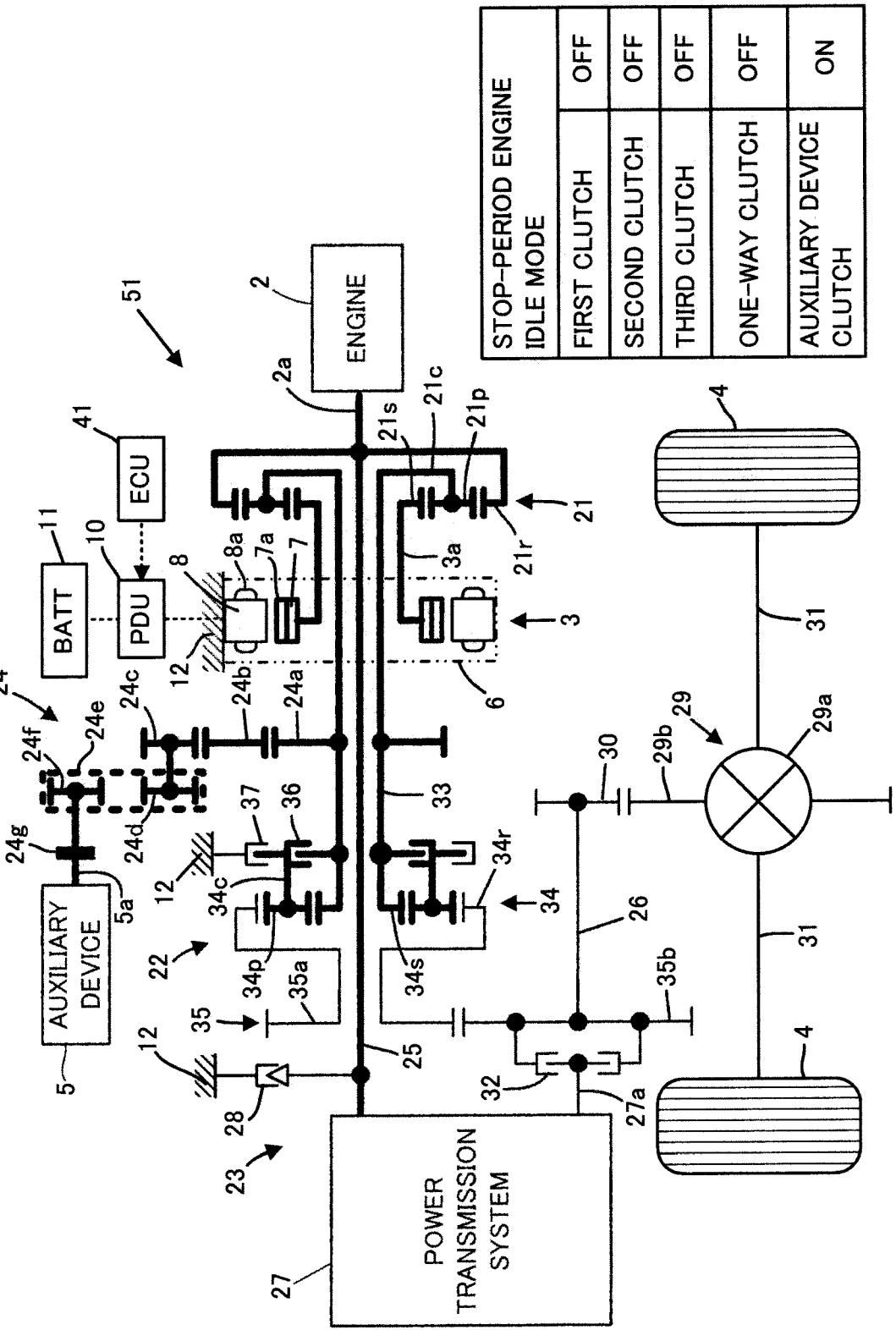
FIG. 17 is a diagram illustrating an operating state in a stop-period engine idle mode of the power unit 51 according to the second embodiment.

FIG. 17 shows the operating state of the power unit 51 in a stop-period engine idle mode, which is an operation mode shifted from the stop-period engine start mode. Moreover, in the stop-period engine idle mode in this embodiment, the auxiliary device 5 is driven by the power of the engine 2 unlike the first embodiment. Moreover, the stop-period engine idle mode in this embodiment also includes a function of the stop-period engine idle charging mode in the first embodiment (a function of performing the regeneration of the motor 3 by the power of the engine 2 to charge the battery 11 in the vehicle stop state).

In the stop-period engine idle mode, the ECU 41 places the first to third clutches 32, 36, and 37 in the same operating states as in the first embodiment, respectively (all in the OFF state), as shown. This disconnects the power transmission between the output shaft 2*a* of the engine 2 and the driving wheels 4, 4 via the second power transmission path 23. Further, the operation mode of the second planetary gear unit 34 is set to the power transmission disabled mode.

Moreover, the ECU 41 maintains the operating state of the auxiliary device clutch 24*g* in the ON state. In the same manner as in the first embodiment, the one-way clutch 28 is maintained in the OFF state.

Further, the ECU 41 controls the motor 3 to be placed in an operation stopped state (a state where an electricity supply to the coil 8*a* is interrupted) or controls the PDU 10 to perform the regeneration of the motor 3. In this case, for example, if the remaining capacity of the battery 11 is relatively low (if the remaining capacity is equal to or lower than a predetermined threshold value), the regeneration of the motor 3 is performed.

In this condition, the carrier 21*c* of the first planetary gear unit 21 becomes rotatable. Therefore, the carrier 21*c* of the first planetary gear unit 21 is rotationally driven in the forward rotation direction in conjunction with the rotation of the ring gear 21*r* of the first planetary gear unit 21 in the forward rotation direction together with the output shaft 2*a* of the engine 2. Consequently, the power of the engine 2 is transmitted from the output shaft 2*a* to the input shaft 5*a* of the auxiliary device 5 via the ring gear 21*r* and the carrier 21*c* of the first planetary gear unit 21, the fourth rotating shaft 33, and the auxiliary device power transmission path 24, and thereby the auxiliary device 5 is driven. Moreover, during regeneration of the motor 3, a part of the power of the engine 2 is transmitted to the rotor 7 of the motor 3 via the first planetary gear unit 21 and thereby the motor 3 generates electricity. Then, the power energy charges the battery 11.

The power (the regenerative torque) of the motor 3 is controlled so that the rotational speed of the carrier 21*c* of the first planetary gear unit 21 is maintained at the rotational speed in the forward rotation direction which enables the auxiliary device 5 to be driven.

The power unit 51 according to this embodiment is capable of driving the auxiliary device 5 by using the power of the engine 2 while performing the regeneration of the motor 3 (while charging the battery 11) in the stop-period engine idle mode as described above. On this account, the stop-period engine idle charging mode as in the first embodiment is unnecessary in this embodiment.

[Engine Drive Start-Up Mode]

Figure 18:
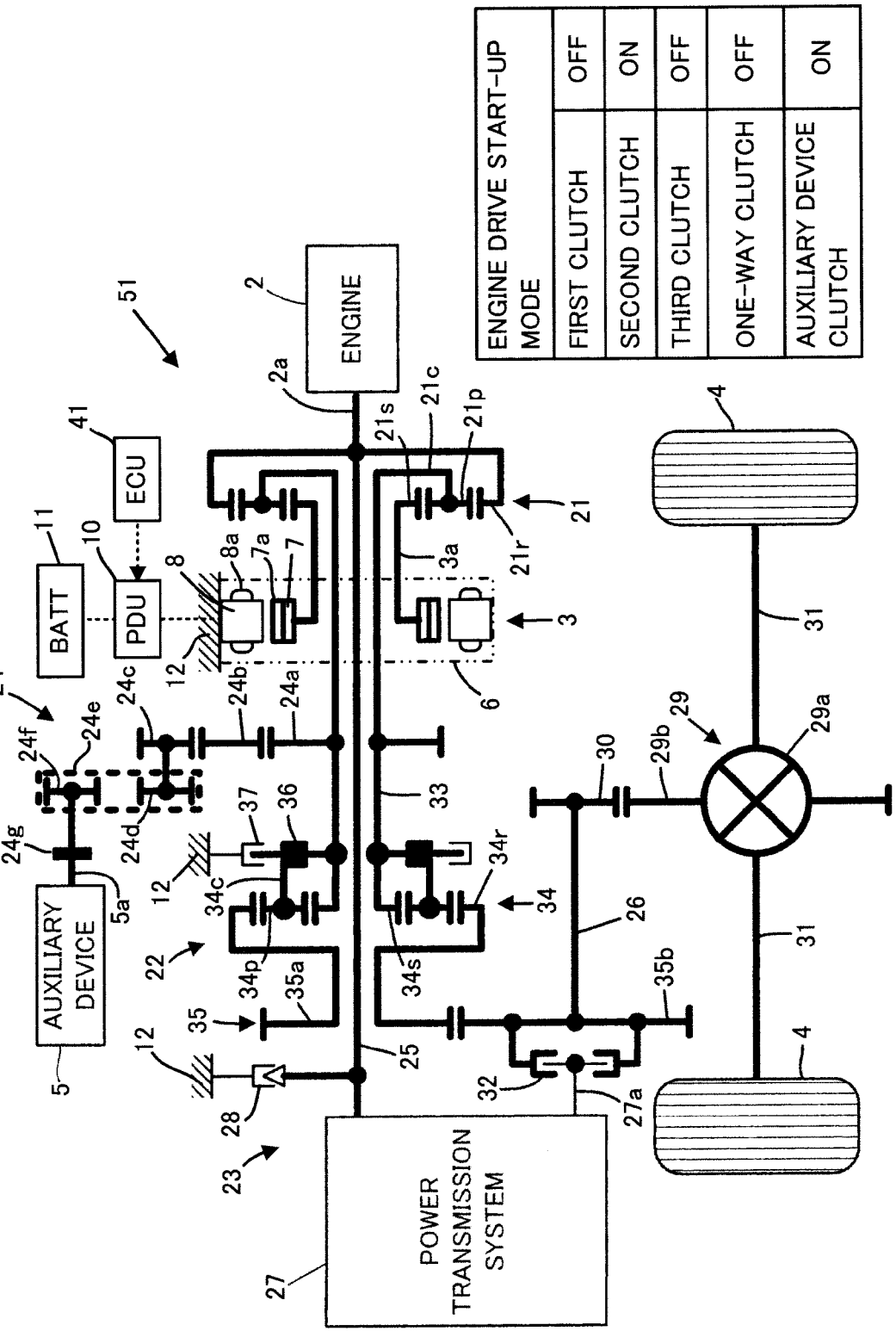
FIG. 18 is a diagram illustrating an operating state in an engine drive start-up mode of the power unit 51 according to the second embodiment.

FIG. 18 shows the operating state of the power unit 51 in an engine drive start-up mode, which is an operation mode shifted from the stop-period engine idle mode. In this engine drive start-up mode, the ECU 41 places the first to third clutches 32, 36, and 37 in the same operating states as in the first embodiment, respectively (the OFF state, the ON state, and the OFF state, respectively), as shown. This disconnects the power transmission between the output shaft 2*a* of the engine 2 and the driving wheels 4, 4 via the second power transmission path 23. Moreover, the operation mode of the second planetary gear unit 34 is set to the integral rotation mode.

In this case, similarly to the first embodiment, the change operation of the second clutch 36 from the OFF state to the ON state (switching the operation mode of the second planetary gear unit 34 from the power transmission disabled mode to the integral rotation mode) is performed after the stop of the rotation of the carrier 21*c* of the first planetary gear unit 21. This prevents an occurrence of a shock caused by sudden braking of the carrier 21*c* of the first planetary gear unit 21 or the like.

In this embodiment, there is no need to change the auxiliary device clutch 24*g* to the OFF state at the time of stopping the rotation of the carrier 21*c* of the first planetary gear unit 21 as described above, but the auxiliary device clutch 24*g* may be maintained in the ON state as shown.

Moreover, in the engine drive start-up mode, the output shaft 2*a* of the engine 2 has already been rotating in the forward rotation direction and therefore the one-way clutch 28 is maintained in the OFF state.

Further, the ECU 41 controls the operations of the engine 2 and the motor 3 quite in the same manner as in the first embodiment with the first to third clutches 32, 36, and 37 operated as described above. Thereby, the vehicles start-up and running is performed by the power of the engine 2.

Moreover, in the engine drive start-up mode in this embodiment, the start-up of the vehicle rotates the carrier 21*c* of the first planetary gear unit 21 along with the fourth rotating shaft 33 in the forward rotation direction. Therefore, a part of the power of the engine 2 is transmitted from the fourth rotating shaft 33 to the input shaft 5a of the auxiliary device 5 via the auxiliary device power transmission path 24 and thereby the auxiliary device 5 is driven.

[Engine Running Mode]

Figure 19:
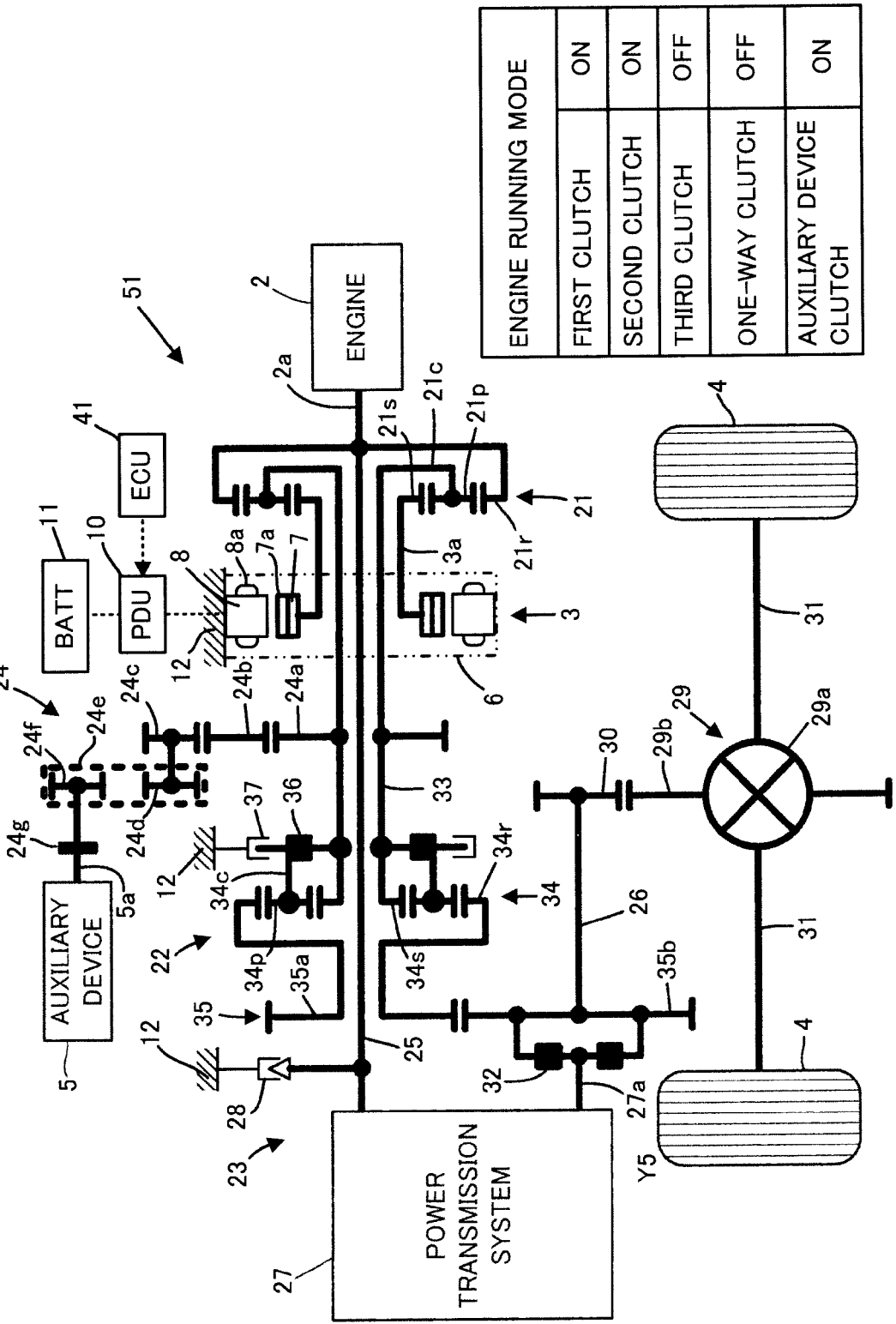
FIG. 19 is a diagram illustrating an operating state in an engine running mode of the power unit 51 according to the second embodiment.

FIG. 19 shows the operating state of the power unit 51 in an engine running mode, which is an operation mode shifted from the post-EV engine start mode or the engine drive start-up mode. In this engine running mode, the ECU 41 places the first to third clutches 32, 36, and 37 in the same operating states as in the first embodiment, respectively (the ON state, the ON state, and the OFF state, respectively), as shown. This enables the power transmission between the output shaft 2a of the engine 2 and the driving wheels 4, 4 via the second power transmission path 23. Moreover, the operation mode of the second planetary gear unit 34 is set to the integral rotation mode.

Moreover, the ECU 41 maintains the operating state of the auxiliary device clutch 24g in the ON state. Since the output shaft 2a of the engine 2 has already been rotating, the one-way clutch 28 is maintained in the OFF state.

Moreover, the ECU 41 controls the power of the engine 2 and the change gear ratio of the change gear of the power transmission system 27 of the second power transmission path 23 according to the depressing amount of the accelerator pedal of the vehicle, the rotational speed of the driving wheels 4, 4 (or the vehicle speed), or the like in the same manner as in the first embodiment, with the first to third clutches 32, 36, and 37 and the auxiliary device clutch 24g operated as described above.

In this operation, the power of the engine 2 is transmitted from the output shaft 2a of the engine 2 to the driving wheels 4, 4 via the second power transmission path 23 and thereby the driving wheels 4, 4 are driven in the advance direction of the vehicle. Moreover, a part of the power of the engine 2 is transmitted to the input shaft 5a of the auxiliary device 5 via the first planetary gear unit 21 and the auxiliary device power transmission path 24. Thereby, the auxiliary device 5 is driven by the power of the engine 2.

In this embodiment, the rotation direction of the sun gear 21s of the first planetary gear unit 21 (=the rotation direction of the output shaft 3a of the motor 3) is, in some cases, the reverse rotation direction due to depending on the rotational speed of the driving wheels 4, 4 (or the vehicle speed) and the change gear ratio of the change gear of the power transmission system 27, in the same manner as in the first embodiment. The carrier 21c of the first planetary gear unit 21 and the fourth rotating shaft 33 for transmitting the power to the auxiliary device 5, however, always rotate in the forward rotation direction. On this account, in the engine running mode in this embodiment, the auxiliary device clutch 24g is maintained in the ON state unlike the first embodiment.

Additionally, in the engine running mode, the power (power running torque) of the motor 3 may be transmitted to the driving wheels 4, 4 in addition to the power of the engine 2 by performing power running of the motor 3, if necessary, in the same manner as in the first embodiment. Alternatively, the battery 11 may be charged by performing the regeneration of the motor 3.

Moreover, both of the second clutch 36 and the third clutch 37 may be placed in the OFF state (the operation mode of the second planetary gear unit 34 is set to the power transmission disabled mode). In this case, the power transmitted to the auxiliary device 5 is able to be adjusted by performing the power running or regeneration of the motor 3.

[Engine Drive Reverse Mode]

Figure 20:
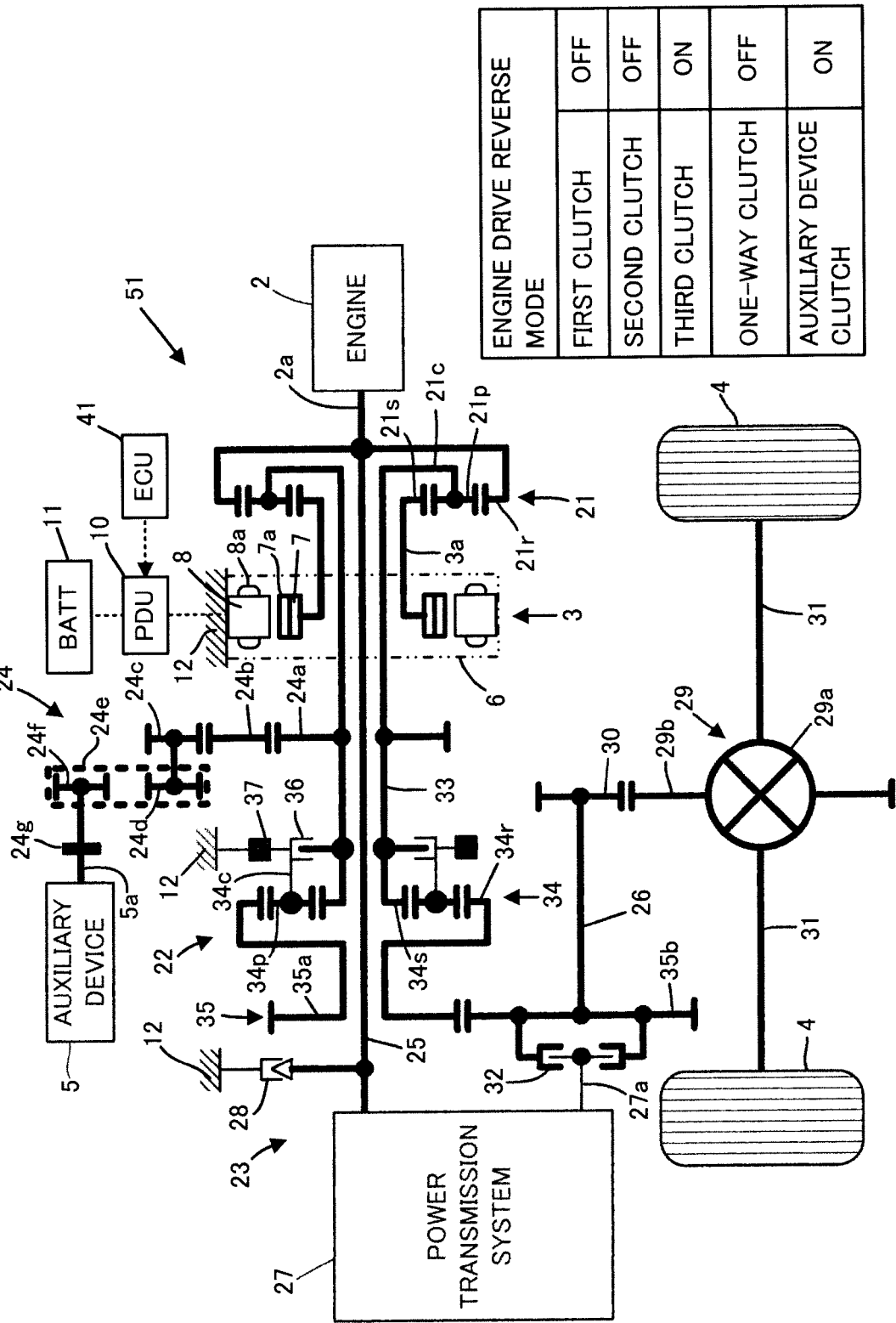
FIG. 20 is a diagram illustrating an operating state in an engine drive reverse mode of the power unit 51 according to the second embodiment.

FIG. 20 shows the operating state of the power unit 51 in an engine drive reverse mode, which is an operation mode shifted from the stop-period engine idle mode. In this engine drive reverse mode, the ECU 41 places the first to third clutches 32, 36, and 37 in the same operating states as in the first embodiment, respectively (the OFF state, the OFF state, and the ON state, respectively), as shown. This disconnects the power transmission between the output shaft 2a of the engine 2 and the driving wheels 4, 4 via the second power transmission path 23. Moreover, the operation mode of the second planetary gear unit 34 is set to the reverse rotation mode.

In this case, if the operation mode immediately before the engine drive reverse mode is the stop-period engine idle mode, the change operation of the third clutch 37 from the OFF state to the ON state (switching the operation mode of the second planetary gear unit 34 from the power transmission disabled mode to the reverse rotation mode) is performed after the stop of the rotation of the carrier 21c of the first planetary gear unit 21, similarly to the change operation of the second clutch 36 from the OFF state to the ON state in the engine drive start-up mode. This prevents an occurrence of a shock caused by sudden braking of the carrier 21c of the first planetary gear unit 21 or the like.

In addition, the output shaft 2a of the engine 2 has already been rotating in the forward rotation direction and therefore the one-way clutch 28 is maintained in the OFF state. Moreover, the ECU 41 maintains the operating state of the auxiliary device clutch 24g in the ON state.

Further, the ECU 41 controls the operations of the motor 3 and the engine 2 quite in the same manner as in the engine drive start-up mode with the first to third clutches 32, 36, and 37 and the auxiliary device clutch 24g operated as described above. In this condition, the operation mode of the second planetary gear unit 34 is the reverse rotation mode. Therefore, the power transmitted from the output shaft 2a of the engine 2 to the driving wheels 4, 4 is in the reversed direction of the vehicle similarly to the first embodiment and thereby the reverse running of the vehicle is performed.

Further, when the vehicle starts up, the carrier 21c of the first planetary gear unit 21 rotates in the forward rotation direction along with the fourth rotating shaft 33. Thereby, a part of the power of the engine 2 is transmitted from the fourth rotating shaft 33 to the input shaft 5a of the auxiliary device 5 via the auxiliary device power transmission path 24, and thereby the auxiliary device 5 is driven.

Additionally, it is possible to reverse the vehicle by using only the power of the motor 3 in this embodiment, too. In this case, the second clutch 36 and the third clutch 37 are placed in the OFF state and the ON state, respectively, instead of placing the second clutch 36 and the third clutch 37 in the ON state and the OFF state in the EV start-up and running mode (the operation mode of the second planetary gear unit 34 is set to the reverse rotation mode, instead of the integral rotation mode). Other operation controls may be the same as those in the EV start-up and running mode.

According to the power unit 51 of this embodiment as described above, the input shaft 5a of the auxiliary device 5 is connected to the carrier 21c of the first planetary gear unit 21 whose rotation direction is maintained in the forward rotation direction via the auxiliary device power transmission path 24. Therefore, the auxiliary device 5 is able to be driven by using the power of one of the engine 2 and the motor 3, which are the power generation sources for driving the driving wheels 4, 4, without using an auxiliary device driving motor different from the motor 3 in a situation other than the rotation stopped state of the carrier 21c.

Moreover, in the same manner as in the first embodiment, the second planetary gear unit 34 provided in the first power transmission path 22 enables the power transmission in the first power transmission path 22 by the combination of the operating states of the second clutch 36 and the third clutch 37. Further, by the combination of the operating states of the second clutch 36 and the third clutch 37, the second planetary gear unit 34 implements a function of disconnecting the power transmission of the first power transmission path 22, a function of switching the rotation direction of the driving wheels 4, 4 rotated by the power transmitted via the first power transmission path 22 with the carrier 21c of the first planetary gear unit 21 rotationally driven in the forward rotation direction, and a function of non-rotatably locking the carrier 21c of the first planetary gear unit 21. Therefore, it is possible to operate the power unit 51 in various operation modes with the configuration of the power unit 51 simplified by decreasing the number of parts of the power unit 51.

[Variations]

The following describes some variations of the first or second embodiment.

Although the power units 1 and 51 mounted on a hybrid vehicle have been described in the first and second embodiments, the driven unit driven by the power unit of the present invention may be other than the driving wheels 4, 4 of the vehicle.

The first and second embodiments have been described by taking the example where the engine 2 (an internal combustion engine) and the motor 3 are provided as a prime mover and a rotary actuator, respectively. Note that, however, a heat engine other than an internal combustion engine may be used as a prime mover. Moreover, the rotary actuator may be an actuator other than the motor 3, for example, a hydraulic rotary actuator.

In the first and second embodiments, the ring gear 21r of the first planetary gear unit 21 and the output shaft 2a of the engine 2 are provided so as to be rotatable integrally with the first rotating shaft 25. Therefore, instead of connecting the first rotating shaft 25 to the immovable part 12 via the one-way clutch 28, the ring gear 21r of the first planetary gear unit 21 or the output shaft 2a of the engine 2 may be connected to the immovable part 12 via the one-way clutch 28.

Further, the present invention may include a brake mechanism operable in an operating state where a braking force is applied to one of the first rotating shaft 25, the ring gear 21r of the first planetary gear unit 21, and the output shaft 2a of the engine 2 via an actuator (consequently, an operating state where a brake is applied to the rotation of the ring gear 21r of the first planetary gear unit 21) and in an operating state where the braking via the actuator is released. Moreover, in the case where the first rotating shaft 25, the ring gear 21r of the first planetary gear unit 21, and the output shaft 2a of the engine 2 are going to rotate in the reverse rotation direction, the rotations of the ring gear 21r of the first planetary gear unit 21 and the like may be braked by controlling the actuator of the brake mechanism.

In the first and second embodiments, the first clutch 32 is provided in a portion between the third rotating shaft 27a and the second rotating shaft 26 in the second power transmission path 23. It is, however, possible to provide the first clutch in another portion in the second power transmission path 23 such as a portion between the first rotating shaft 25 and the power transmission system 27.

In the first and second embodiments, the forward/reverse rotation switching mechanism composed of the second planetary gear unit 34, the second clutch 36, and the third clutch 37 has the functions of the first power transmission system and the second locking mechanism according to the present invention. The first power transmission system or the second locking mechanism according to the present invention, however, may be provided separately from the forward/reverse rotation switching mechanism. For example, a clutch mechanism similar to the first clutch 32 may be interposed between the ring gear 34r of the second planetary gear unit 34 and the power transmission system 35, and the clutch mechanism may form the first power transmission system. Moreover, for example, the fourth rotating shaft 33 may be connected to the immovable part 12 via a clutch mechanism similar to the third clutch 37, and the clutch mechanism may form the second locking mechanism.

Note that, however, the provision of the functions of the first power transmission system and the second locking mechanism to the forward/reverse rotation switching mechanism as in the first and second embodiments enables an effective reduction in the number of parts of the power units 1 and 51 and an effective simplification of the configuration thereof. Consequently, it leads to a reduction in the manufacturing cost of the power units 1 and 51.

Although a differential gear is formed by the first planetary gear unit 21 in the first and second embodiments, a differential gear may be used other than a planetary gear unit.

In the first and second embodiments, the output shaft 2a of the engine 2 (prime mover) is connected to the ring gear 21r of the first planetary gear unit 21 and the rotor 7 of the motor 3 (rotary actuator) is connected to the sun gear 21s. For example, however, the output shaft 2a of the engine 2 may be connected to the sun gear 21s and the rotor 7 of the motor 3 may be connected to the ring gear 21r. Further, in this case, the first planetary gear unit (differential gear) may be disposed inside the rotor 7 in the housing 6 of the motor 3. Moreover, it is possible to configure the power unit in which one of the rotor 7 of the motor 3 and the output shaft 2a of the engine 2 is connected to the carrier 21c of the first planetary gear unit 21 and the other is connected to one of the sun gear 21s and the ring gear 21r.

In the first and second embodiments, the sun gear 34s of the second planetary gear unit 34 is connected to the carrier (the third rotating element) of the first planetary gear unit 21. The ring gear 34r of the second planetary gear unit 34 may be connected to the carrier (the third rotating element) of the first planetary gear unit 21 and the sun gear 34s of the second planetary gear unit 34 may be connected to the driving wheels 4, 4 (the driven unit) via the power transmission system 35 and the like.

In the first and second embodiments, the power transmission system 27 in the second power transmission path 23 includes the CVT 27c. The power transmission system 27, however, may be formed of a mechanism providing a fixed reduction ratio. For example, the power transmission system 27 may be formed of a pair of gears fixed to the first rotating shaft 25 and the third rotating shaft 27a, respectively, and meshed with each other.

In the first and second embodiments, the auxiliary device power transmission path 24 is configured as described above. For example, however, the third gear 24d, the belt 24e, and the fourth gear 24f may be omitted and the input shaft 5a of the auxiliary device 5 may be connected coaxially with the second gear 24c via the auxiliary device clutch 24g. For the auxiliary device power transmission path 24, an appropriate configuration may be adopted in consideration of the positional relationship between the components of the power units 1 and 51.

In the first and second embodiments, the auxiliary device clutch 24g is always placed in the ON state in a situation where the auxiliary device 5 is able to be driven. If there is no request for driving the auxiliary device 5 such as during the operation stop period of the air conditioner, however, the auxiliary device clutch 24g may be operated in the OFF state. In addition, in the second embodiment, the auxiliary device clutch 24g may be placed in the ON state in any operating state of the power unit 51. Therefore, the auxiliary device clutch 24g may be omitted and the gear 24f of the auxiliary device power transmission path 24 may be connected to the input shaft 5a so as to rotate integrally with the input shaft 5a of the auxiliary device 5.

What is claimed is:

1. A power unit for driving a driven unit and an auxiliary device, comprising:
 a prime mover having an output shaft for use in outputting power;
 a rotary actuator having a body of rotation for use in outputting power;
 a differential gear having a first rotating element, a second rotating element, and a third rotating element capable of transmitting power between each other, wherein the first rotating element is connected to the output shaft of the prime mover, the second rotating element is connected to the body of rotation of the rotary actuator, and the third rotating element is connected to the driven unit via a first power transmission path;
 a first power transmission system included in the first power transmission path and selectively operable between a first operating state for enabling power transmission in the first power transmission path and a second operating state for disconnecting power transmission in the first power transmission path;
 a second power transmission path which connects the output shaft of the prime mover and the driven unit bypassing the differential gear and the first power transmission system; and
 a second power transmission system included in the second power transmission path and selectively operable between a third operating state for enabling power transmission in the second power transmission path and a fourth operating state for disconnecting power transmission in the second power transmission path without disconnecting the power transmission in the first power transmission path,
 wherein the auxiliary device is connected to one of the second rotating element and the third rotating element of the differential gear.

2. The power unit according to claim 1, wherein the differential gear is a first planetary gear unit having a first sun gear which forms the second rotating element, a first ring gear which forms the first rotating element, and a first carrier which forms the third rotating element and rotationally supports a planetary gear meshed with the first sun gear and the first ring gear.

3. The power unit according to claim 2, wherein the auxiliary device is connected to the first carrier which forms the third rotating element.

4. The power unit according to claim 1, further comprising a brake mechanism selectively operable between a fifth operating state in which the rotation of the first rotating element of the differential gear is inhibited or braked and a sixth operating state in which the inhibition or braking of the rotation is released.

5. The power unit according to claim 4, further comprising a forward/reverse rotation switching mechanism selectively operable between a seventh operating state in which the third rotating element of the differential gear transmits power to the driven unit so that the rotation direction of the driven unit which rotates by the power transmitted to the driven unit is one of two, namely forward and reverse rotation directions via the first power transmission path and an eighth operating state in which the third rotating element of the differential gear transmits power to the driven unit so that the rotation direction of the driven unit is the other of the two rotation directions.

6. The power unit according to claim 5, wherein the forward/reverse rotation switching mechanism includes:
 a second planetary gear unit, which has a second sun gear, a second ring gear, and a second carrier rotatably supporting a second planetary gear meshed with the second sun gear and the second ring gear, in which the second sun gear is connected to the third rotating element of the differential gear and the second ring gear is connected to the driven unit;
 a first locking mechanism selectively operable between a ninth operating state in which the second carrier is non-rotatably locked and a tenth operating state in which the lock is released; and a first clutch mechanism selectively operable between an eleventh operating state in which the second carrier is integrally and rotatably connected to one of the second sun gear and the second ring gear and a twelfth operating state in which the connection is released;
 the forward/reverse rotation switching mechanism has a state in which the first locking mechanism and the first clutch mechanism are placed in the tenth operating state and the eleventh operating state, respectively, as one of the seventh operating state and the eighth operating state; and
 the forward/reverse rotation switching mechanism has a state in which the first locking mechanism and the first clutch mechanism are placed in the ninth operating state and the twelfth operating state, respectively, as the other of the seventh operating state and the eighth operating state.

7. The power unit according to claim 6, wherein the forward/reverse rotation switching mechanism has a state in which the first locking mechanism and the first clutch mechanism are placed in the ninth operating state and the eleventh operating state, respectively, as the operating state in which the third rotating element of the differential gear is non-rotatably locked.

8. The power unit according to claim 6, wherein:
 the forward/reverse rotation switching mechanism serves as the first power transmission system;
 the forward/reverse rotation switching mechanism has a state in which the first locking mechanism and the first clutch mechanism are placed in the tenth operating state and the eleventh operating state, respectively, or a state in which the first locking mechanism and the first clutch mechanism are placed in the ninth operating state and the twelfth operating state, respectively, as the first operating state; and
 the forward/reverse rotation switching mechanism has a state in which the first locking mechanism and the first clutch mechanism are placed in the tenth operating state and the twelfth operating state, respectively, as the second operating state.

9. The power unit according to claim 8, further comprising a second locking mechanism selectively operable between a thirteenth operating state in which the third rotating element of the differential gear is non-rotatably locked and a fourteenth operating state in which the lock is released.

* * * * *